(12) United States Patent
Buchhop et al.

(10) Patent No.: US 8,554,872 B2
(45) Date of Patent: Oct. 8, 2013

(54) INTEGRATION OF DIFFERENT MOBILE DEVICE TYPES WITH A BUSINESS INFRASTRUCTURE

(75) Inventors: Peter K. Buchhop, Cary, IL (US); Anne Bradford Fyk, Highland Park, IL (US); Krsto Sitar, Cicero, IL (US); Davindar Singh Gill, Palatine, IL (US); William J. Riley, Villa Park, IL (US)

(73) Assignee: Bank of America Corporation, Charlotte, NC (US)

( * ) Notice: Subject to any disclaimer, the term of this patent is extended or adjusted under 35 U.S.C. 154(b) by 171 days.

(21) Appl. No.: 13/108,545

(22) Filed: May 16, 2011

(65) Prior Publication Data

US 2011/0247082 A1    Oct. 6, 2011

Related U.S. Application Data

(63) Continuation-in-part of application No. 12/751,234, filed on Mar. 31, 2010.

(51) Int. Cl.
*G06F 15/16* (2006.01)

(52) U.S. Cl.
USPC ............................. 709/217; 709/218; 709/219

(58) Field of Classification Search
USPC .............. 455/410, 411, 456.1; 709/228, 225, 709/223, 227, 206, 217, 218.219; 713/100, 713/183, 200
See application file for complete search history.

(56) References Cited

U.S. PATENT DOCUMENTS

| | | | |
|---|---|---|---|
| 5,784,612 A * | 7/1998 | Crane et al. ................... | 713/100 |
| 6,741,853 B1 | 5/2004 | Jiang et al. | |
| 7,136,631 B1 * | 11/2006 | Jiang et al. ................. | 455/414.1 |
| 7,546,956 B2 | 6/2009 | Adams et al. | |
| 7,957,691 B1 | 6/2011 | Lee | |
| 2002/0090980 A1 | 7/2002 | Wilcox et al. | |
| 2002/0184150 A1 | 12/2002 | Wong et al. | |

(Continued)

FOREIGN PATENT DOCUMENTS

WO    2008149101 A2    12/2008

OTHER PUBLICATIONS

Non-Final Office Action mailed Jul. 30, 2012 in related U.S. Appl. No. 12/751,234.

(Continued)

*Primary Examiner* — Anh-Vu Ly
*Assistant Examiner* — Gustavo Lopez-Vargas
(74) *Attorney, Agent, or Firm* — Banner & Witcoff, Ltd.; Michael A. Springs

(57) ABSTRACT

A mobile implementation channel enables secure mobile customer alerts, content delivery, event and location awareness and context integration that can be leveraged across multiple lines of business using basic interfaces. Pushed documents may be processed by an application executing at a mobile device in a secure manner. An alert indication may be sent to the mobile device when the documents are available. The documents may then be downloaded over a secure channel if the user affirmatively responds to the alert indication and may be further encrypted and stored in an application file store. The user may subsequently select one of the documents from a document list so that the selected document may be decrypted and displayed. The stored documents in the application file store may be deleted if the operating system has been compromised, the user is not associated with a business, or the user device is lost or stolen.

20 Claims, 24 Drawing Sheets

(56) References Cited

U.S. PATENT DOCUMENTS

| | | | |
|---|---|---|---|
| 2004/0003294 A1* | 1/2004 | Moore | 713/202 |
| 2004/0064707 A1 | 4/2004 | McCann et al. | |
| 2004/0162880 A1* | 8/2004 | Arnone et al. | 709/206 |
| 2004/0199665 A1 | 10/2004 | Omar et al. | |
| 2005/0204147 A1* | 9/2005 | Yamasaki et al. | 713/183 |
| 2006/0137000 A1* | 6/2006 | Isaacson | 726/7 |
| 2007/0208863 A1* | 9/2007 | Otsuka et al. | 709/227 |
| 2007/0260674 A1 | 11/2007 | Shenfield | |
| 2008/0034078 A1* | 2/2008 | Sano et al. | 709/223 |
| 2008/0109529 A1 | 5/2008 | Story | |
| 2008/0147861 A1* | 6/2008 | Oishi et al. | 709/225 |
| 2009/0031006 A1 | 1/2009 | Johnson | |
| 2009/0265734 A1 | 10/2009 | Dion et al. | |
| 2009/0319425 A1 | 12/2009 | Tumminaro et al. | |
| 2010/0029306 A1 | 2/2010 | Sarmah et al. | |
| 2010/0174756 A1 | 7/2010 | Lazaridis et al. | |
| 2010/0178898 A1 | 7/2010 | Dupuis et al. | |
| 2010/0191602 A1 | 7/2010 | Mikkelsen et al. | |
| 2010/0205148 A1* | 8/2010 | Leblanc et al. | 707/628 |
| 2010/0325194 A1 | 12/2010 | Williamson et al. | |
| 2011/0055410 A1* | 3/2011 | Iwase | 709/228 |
| 2011/0060684 A1 | 3/2011 | Jucht et al. | |
| 2011/0141276 A1* | 6/2011 | Borghei | 348/143 |
| 2011/0145739 A1* | 6/2011 | Berger et al. | 715/763 |
| 2011/0159884 A1 | 6/2011 | Chawla | |
| 2013/0065608 A1* | 3/2013 | Nakajima et al. | 455/456.1 |

OTHER PUBLICATIONS

Final Office Action mailed May 11, 2012 in related U.S. Appl. No. 12/751,234.

International Search Report for related PCT Application No. PCT/US2011/028594, mailed May 18, 2011, pp. 1-8.

International Search Report for related PCT Application No. PCT/US2011/028599, mailed May 18, 2011, pp. 1-8.

International Search Report for related PCT Application No. PCT/US2011/028603, mailed May 18, 2011, pp. 1-8.

\* cited by examiner

1001

The user is alerted and directed to view the account statement on their mobile device; for devices where document display is not handled automatically, the client library will be invoked to display the account statement via the Content Handler API

FIG. 10

INTEGRATION OF DIFFERENT MOBILE DEVICE TYPES WITH A BUSINESS INFRASTRUCTURE

This application is a continuation-in-part of commonly-owned, co-pending U.S. application Ser. No. 12/751,234 filed on Mar. 31, 2010, naming Peter K. Buchhop, Anne Bradford Fyk, and Krsto Sitar as inventors.

FIELD

Aspects of the embodiments generally relate to a computer system that integrates a business infrastructure to different mobile device types. In particular, alerts, content delivery, event and location awareness may be provided to an appropriate mobile channel based on the context for multiple lines of business.

BACKGROUND

Bank customers are increasingly using mobile banking services (e.g., M-Banking, mbanking, and SMS Banking) to perform balance checks, account transactions, and payments via a mobile device such as a mobile phone. For example, according to one industry survey, banks that offer mobile financial services may increase the number of new customer acquisitions by as much as sixty percent. The current pace of mobile adoption appears to be exceeding that of past innovations, including ATMs, debit cards, and online banking. About a third of consumers are currently using, or at least considering using, mobile financial services in the next year, and some projections forecast that mobile financial service adoption will exceed the use of on-line banking by 2015.

Mobile banking is currently most often performed via short message service (SMS) or the mobile Internet but also may use special programs called clients downloaded to the mobile device. New types of mobile devices are being and will continue to be introduced in the future. For example, as smartphone adoption continues to rise and more sites and apps accommodate them, our culture is headed for a very mobile world at a very fast pace. However, content distribution to mobile devices is currently limited, difficult, and done sporadically or not at all. It is thus important that mobile banking supports the ubiquity of mobile devices.

BRIEF SUMMARY

Aspects of the embodiments address one or more of the issues mentioned above by providing methods, computer readable media, and apparatuses for supporting a mobile implementation channel that enables secure mobile customer alerts, content delivery, event and location awareness and context integration that can be leveraged across multiple lines of business using basic interfaces. The mobile implementation channel enables secure reach to many mobile device types, abstracts away delivery peculiarities, and provides logging and security support when necessary taking into account who the individual is, where they are, and what they may be doing; thus leveraging identity, location (e.g., location-based services), and activity (e.g., business process management).

With another aspect of the embodiments, a business infrastructure (associated with a workflow or business method) generates a request that includes a user identification. A computer system then maps the user identification to a device type from a plurality of device types and directs the request to a device of the user based on the device type, which may be obtained by the device registering with the computer system. Depending on the device type, the request may be directed through a wireless gateway or directly to the device via a wireless carrier service.

With another aspect of the embodiments, a request may include content that is also sent to a designated user device. The format of the content may be formatted in accordance with the device type. The content may then be pushed to a device at a desired time or frequency.

With another aspect of the embodiments, a requesting user can request that the locations of selected user devices be obtained so that location information can be returned to the requesting user.

With another aspect of the embodiments, content, e.g., one or more pushed documents from a context server may be processed by an application executing at a user's mobile device in a secure manner. As will be discussed, an alert indication may be sent to the mobile device when the one or more documents are available. The documents may then be downloaded over a secure channel if the user affirmatively responds to the alert indication and may be further encrypted and stored in an application file store. The user may subsequently select one of the documents from a document list so that the selected document may be decrypted and displayed to the user.

With another aspect of the invention, stored documents in the application file store may be deleted if the operating system has been compromised, the user is not associated with the business providing the documents, or the user device has been lost or stolen.

Aspects of the embodiments may be provided in a computer-readable medium having computer-executable instructions to perform one or more of the process steps described herein.

These and other aspects of the embodiments are discussed in greater detail throughout this disclosure, including the accompanying drawings.

BRIEF DESCRIPTION OF THE DRAWINGS

The present invention is illustrated by way of example and not limited in the accompanying figures in which like reference numerals indicate similar elements and in which:

FIG. 10 shows a continuation of the flow diagram shown in FIG. 9 in accordance with various aspects of the embodiments.

DETAILED DESCRIPTION

Figure 1:
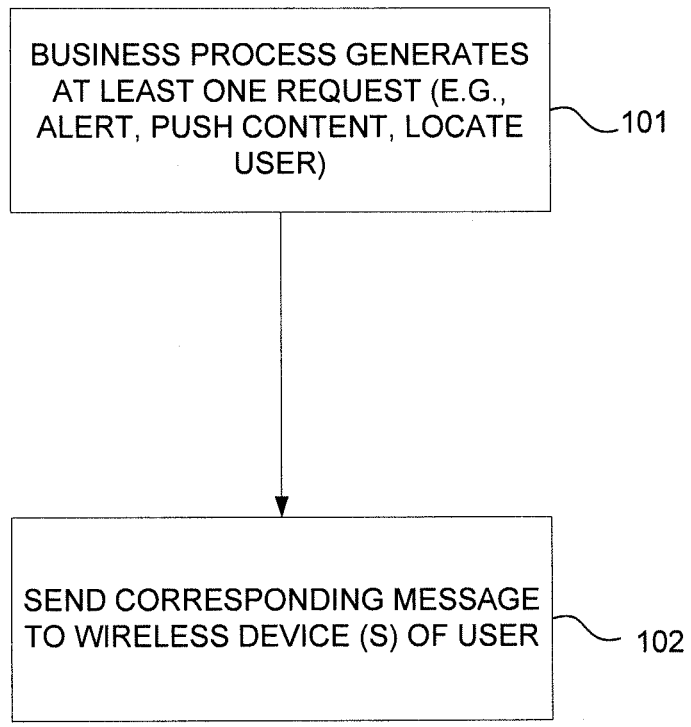
FIG. 1 shows flow diagram in which a business process generates requests to a wireless device in accordance with various aspects of the embodiments.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

In the description herein, the following terms are referenced.

Mobile Banking:

Mobile banking may include mobile banking services (e.g., M-Banking, mbanking, and SMS Banking) for performing balance checks, account transactions, and payments via a mobile device such as a mobile phone, and the like. Financial institutions are offering products that are directed to mobile banking. For example, a cash management banking channel, which features intuitive technology that allows commercial and corporate clients to move beyond transactions to focus on their core businesses and provides a single point of access to global treasury, debt, cash management, investments, trade finance, foreign exchange services and other financial capabilities. Also, financial institutions may offer free mobile banking, in which customers use mobile phones or devices to bank in several ways: Mobile Web or with Mobile Applications.

Push:

A push (or "server-push") may include, for example, the delivery of information on the Web that is initiated by the information server rather than by the information user, recipient or client, as it usually is. In contrast, a pull is generated by specifically requesting information from a particular source. Downloading web pages with a web browser is an example of pull technology.

In accordance with various aspects of the embodiments, methods, computer-readable media, and apparatuses are disclosed to support a mobile implementation channel that enables secure mobile customer alerts, content delivery, event and location awareness and context integration that can be leveraged across multiple lines of business using basic interfaces. The mobile implementation channel enables secure reach to many mobile device types, abstracts away delivery peculiarities, and provides logging and security support when necessary taking into account who the individual is, where they are, and even what they may be doing; thus leveraging identity, location (e.g., location-based services), and activity (e.g., business process management).

Mobile banking is currently most often performed via short message service (SMS) or the mobile Internet but may also use special programs called clients downloaded to the mobile device. However, content distribution to mobile devices is currently limited, difficult, and done sporadically or not at all. In addition, it is often difficult to distribute content across multiple device types, to relate devices to location, or to integrate with existing workflow implementations, enterprise content management (ECM), or business intelligence (aka reporting).

FIG. 1 shows a flow diagram in which a business process generates requests to a wireless device in accordance with various aspects of the embodiments. Aspects of the embodiments generally relate to a computer system that integrates a business infrastructure, which is processing business process 101, to different mobile device types (corresponding to block 102). The business process may be based on a business process model or workflow. For example a workflow may include a sequence of connected steps in order to depict a sequence of operations representing work of a person, a group of persons, an organization of staff, or one or more simple or complex mechanisms.

Alerts, content delivery, event and location awareness can be provided to an appropriate mobile channel based on the context for multiple lines of business. Business process 101 may be based on a business infrastructure that further applies a layer of security, in which a request may be generated at appropriate points of business process 101. Examples of requests include, but are not limited to, an alert to a user, push content to the user, and obtaining the location of the user.

Figure 2:
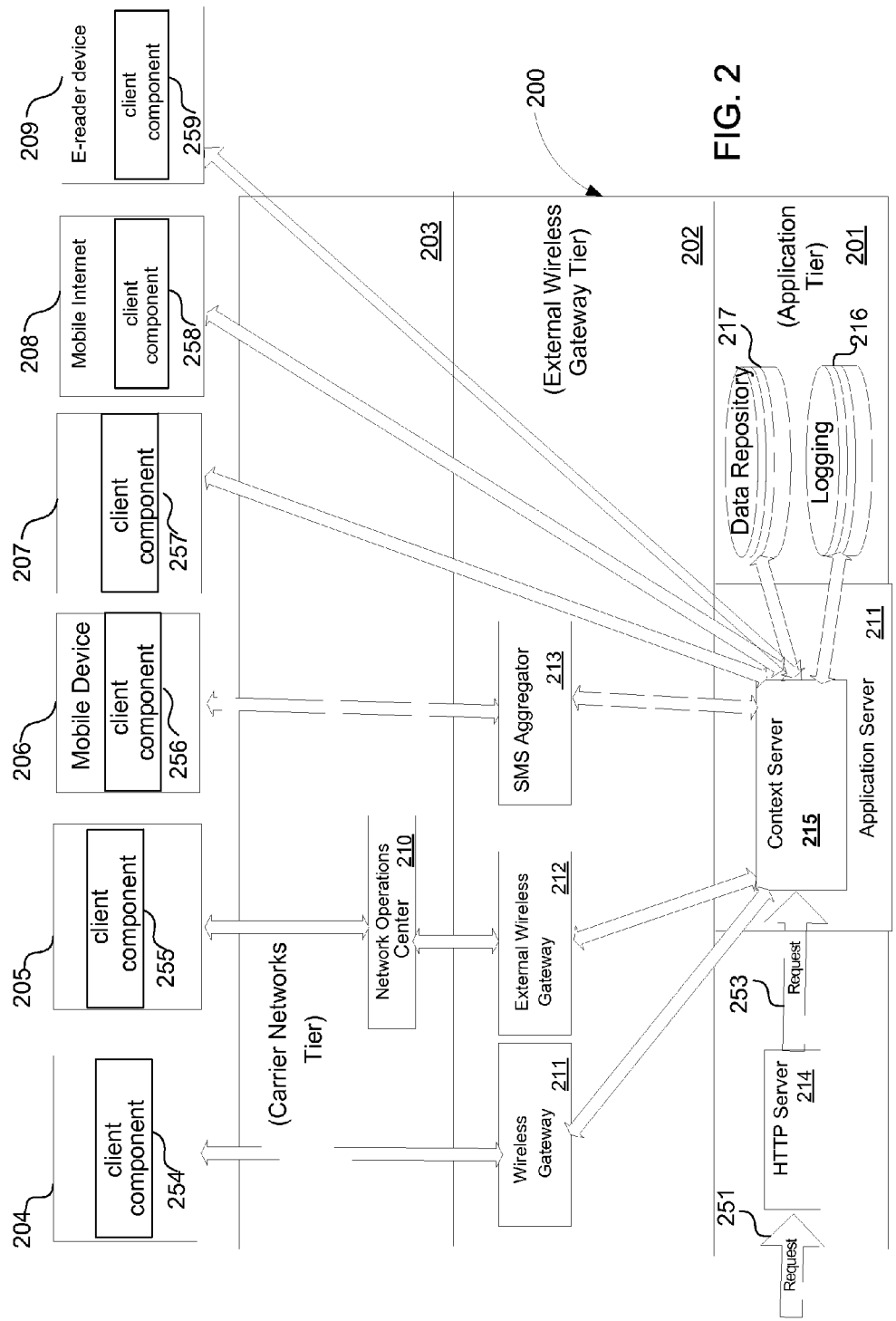
FIG. 2 shows a system that integrates different wireless devices with a business process model in accordance with various aspects of the embodiments.

Block 102 then sends a message to a wireless device of the user based on the device type. Different types of mobile device types may be supported, including mobile Internet devices, and SMS-capable mobile devices. With some embodiments, block 102 is implemented as middleware that is executed at Context Server 215 as shown in FIG. 2. Block 102 processes the request based on who is the user, where the user is, what the user is doing, and what the user wants. The request may be initiated though an application programming interface (API), in which business process 101 provides a user identity. With some embodiments, the API may be based on REST-style architectures that consist of clients and servers. Clients initiate requests to servers. The servers then process requests and return appropriate responses. Requests and responses are built around the transfer of representations of resources. A resource may be essentially any coherent and meaningful concept that may be addressed. A representation of a resource is typically a document that captures the current or intended state of a resource. Block 102 then determines what type of device the user is associated with and directs the request accordingly. Also, if content is being pushed to the user, the format of the content may be formatted in accordance with the associated device type.

Business process 101 may be associated with different types of businesses. While some of the examples described herein may be related to financial institutions, embodiments may also support other types of businesses including manufacturing, service businesses, retailers, information businesses, and high technology businesses.

FIG. 2 shows system 200 that integrates different wireless devices 204-209 with a business process model in accordance with various aspects of the embodiments. With traditional systems there may be a significant amount of complexity regarding the wireless channel resulting in the mobile channel being underutilized for associates and customers, in which usage may be limited to mobile web-content. However, mobile banking services are trending toward a richer offering for the user. For example, a bank may offer on-line banking customers mobile banking, in which a customer may access an account through the mobile web or with a mobile application. Mobile applications may be provided for different mobile devices, including one type of commercially available mobile phone devices (e.g., device 204) another type of commercially available mobile phone devices (e.g., device 205), and another type of commercially available mobile phone devices (e.g., device 207). The mobile applications may be designed to provide a customized mobile banking experience and to offer convenience to the user. Moreover, Context Server 215 may support new device types as they become available by integrating only components at tiers 202 and 203 that support the new device type.

With some embodiments, mobile banking provides a richer set of functioning alternatives to the general web based banking features. However, the alternatives typically circumvent a piecemeal, fragmented fashion with little continuity. As the feature and customer space grows both in size and capability, there may be more offerings, and consequently embodiments should avoid potentially more fragmentation so that a user (customer) is offered a coherent relationship channel to the financial institution.

System 200 provides a mobile implementation channel to enable secure mobile customer alerts, content delivery, event and location awareness and context integration that can be leveraged across multiple lines of business using simple interfaces. System 200 enables secure reach to different mobile device types, abstracts away delivery peculiarities, and provides logging and security support when necessary taking into account who the user of a mobile device is, where the user is, and what the user may be doing, consequently leveraging identity, location (location based services), and activity (business process management). Thus, system 200 processes requests based on the user context, where supporting system components may be referenced with the term "wContext" in the description herein.

With an aspect of the embodiments, system 200 supports enterprise integration using either a console, device library, RESTful API, or direct industry standard XML Process Definition Language (XPDL) or Java specification requests (e.g., JSR 211) for business process management (BPM) or enterprise content management (ECM), respectfully. In addition, some embodiments handle the security, logging, and delivery details based on the request preference.

System 200 may be modeled into layered tiers, including application tier 201, external wireless gateway tier 202, and carrier networks tier 203, in which system components are partitioned into application components, external wireless gateway components, and carrier network components, respectively.

Context Server 215 determines which devices the users (identified administrators) have from request 251 through HTTP server 214 and pushes the alert request through the appropriate mobile channel(s) to the devices. For different device types, the request may be directed to different mobile channel types. For example, with certain devices 205, the push may be sent through an External Wireless Gateway 212 to a Network Operations Center 210. With other devices 204, the push may be sent through a Push Notification Service Wireless Gateway 211. With other devices 207, mobile internet device 208, or E-reader device 209, the push may be sent directly to device 207 through the wireless network and processed by the client component 254-258. Also, Context Server 215 may support short message service (SMS)-capable mobile devices (e.g., mobile device 206) through SMS aggregator 213, which functions as an SMS gateway.

Request 251 may include one or more request type, including alert, location request, push ECM content), and content. Request 251 may be initiated from a Web console, device, or application via the API. With some embodiments, request 251 includes a user identity. Context Server 215 may access data repository 217 in order to obtain the type of device type for the user's device. Context Server 215 consequently directs the request through the appropriate mobile channel type based on the device type.

With some embodiments, client components 254-258 provides the appropriate device type of mobile devices 204-208 to Context Server 215 when the mobile device registers. Also, with some embodiments, client components 254-258 obtain location information for the mobile device, e.g., from a Global Positioning System (GPS) receiver, and report the location information when a request is received from Context Server 215. Consequently, client components 254-258 automatically provide overhead information to system 200 so that the user is not burdened with inputting this information.

Figure 3:
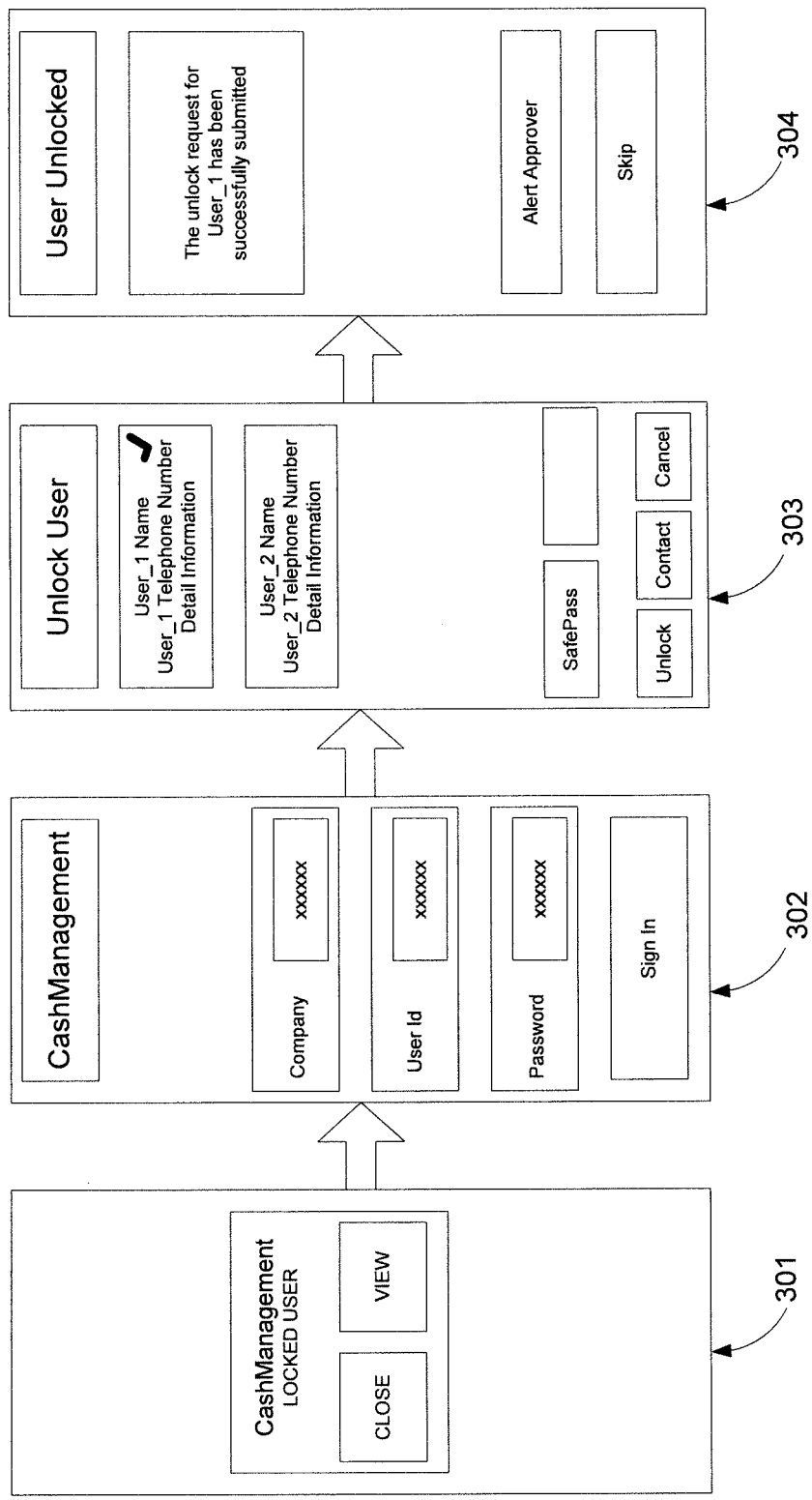
FIG. 3 shows an illustrative screenshots when unlocking a cash management account in accordance with various aspects of the embodiments.

FIG. 3 shows illustrative screenshots 301-304 when unlocking a cash management account in accordance with various aspects of the embodiments. The cash management banking channel, which may support mobile banking services, features intuitive technology that allows commercial and corporate clients to move beyond transactions to focus on their core businesses. The result of a multi-million dollar investment that addresses the needs and preferences of clients. The cash management service may provide a single point of access to global treasury, debt, cash management, investments, trade finance, foreign exchange services, and other financial capabilities.

With traditional systems, when a cash management user is locked out of the user's account, the user contacts (e.g., by phone/email) one of the designated cash management administrators at the user's company. The contacted administrator then logs into the cash management service (via desktop/laptop) and submits the unlock request. A second administrator then is contacted (e.g., by phone/email) to approve the request in the cash management service (via desktop/laptop).

With an aspect of the embodiments, system 200 enables an administrator to unlock and approve unlocks from mobile device 204, 205, 206, 207, or 208 so that the administrator does not have to be at their desk or start up their laptop. An automatic push alert notification is generated so that the system notifies the next person in the process automatically once a step is completed.

The scenario shown in FIG. 3 assumes that the user (customer), after being locked out, selects a link "Request Account Unlock" in the cash management service. This action causes the cash management service to push an alert message push to the designated administrator(s) for the user's company. The first administrator sees an alert on the administrator's mobile device for a "Locked User" in screenshot 301. When the first administrator clicks on "View", the first administrator is presented with screenshot 302 so that the first administrator can sign-in. The first administrator is then presented with "Unlock User" page 303, where the first administrator can select the user(s) and submit the unlock request. Once the request has been successfully submitted, the first administrator can use the "Alert Approver" in screenshot 304 to notify a second administrator that there is a request that needs to be approved.

Figure 4:
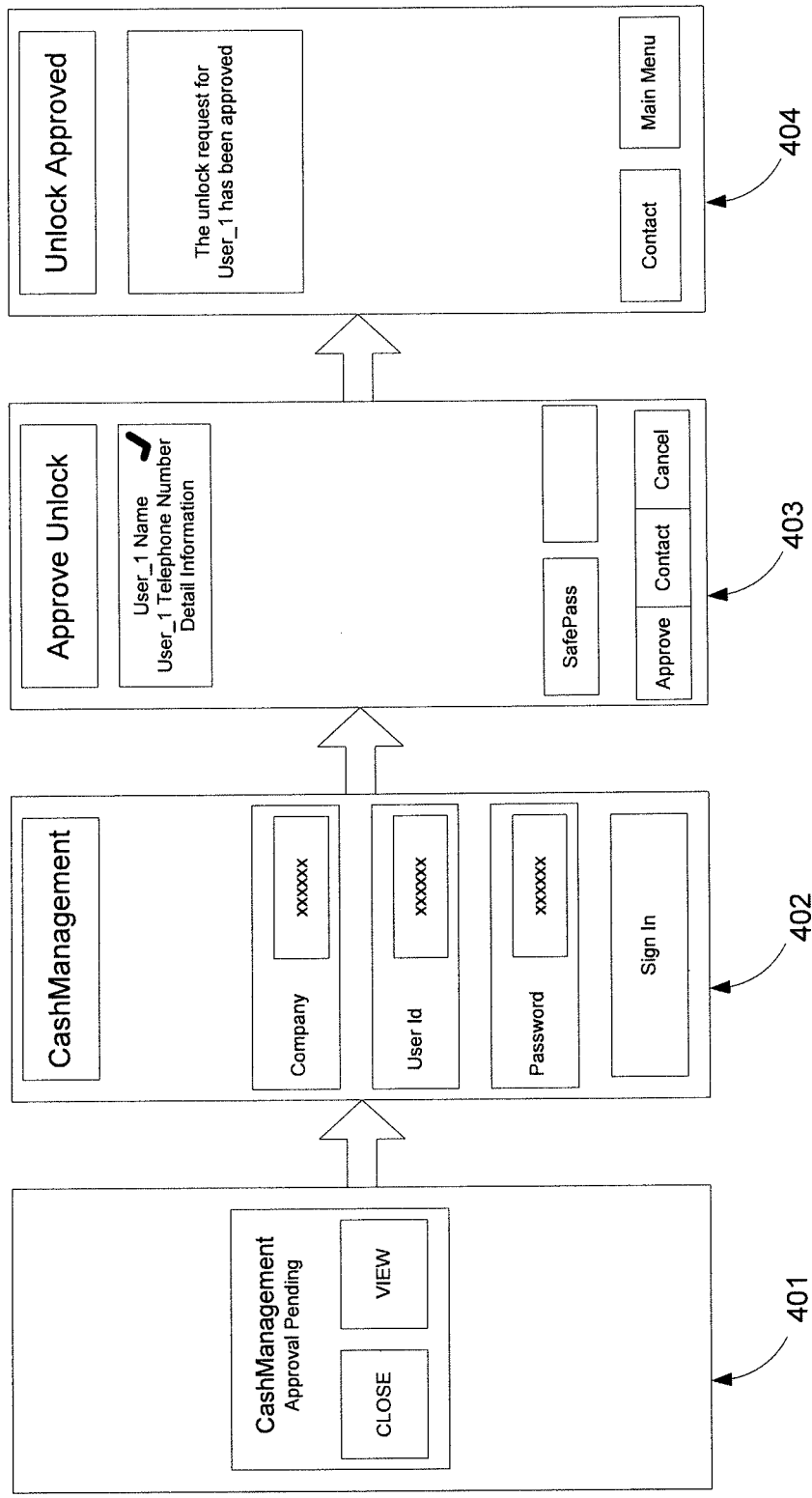
FIG. 4 shows a continuation of the screenshots shown in FIG. 3 in accordance with various aspects of the embodiments.

FIG. 4 shows screenshots 401-404, which are a continuation of screenshots shown in FIG. 3 in accordance with various aspects of the embodiments. With screenshot 401, the second administrator receives an alert on the administrator's mobile device for an unlock request that is pending approval. When the second administrator clicks on "View", screenshot 402 is presented so that the second administrator can sign-in. "Approve Unlock" page 403 is then presented so that the second administrator can select the user(s) and approves the unlock. When the approval has been completed, screenshot 404 is presented to the second administrator.

With some embodiments, an administrator can select the "Contact" button at any point during the scenario to call, generate a SMS message, or e-mail the user or another administrator from the administrator's mobile device. The Main Menu may allow the user to unlock and approve users directly.

Figure 5:
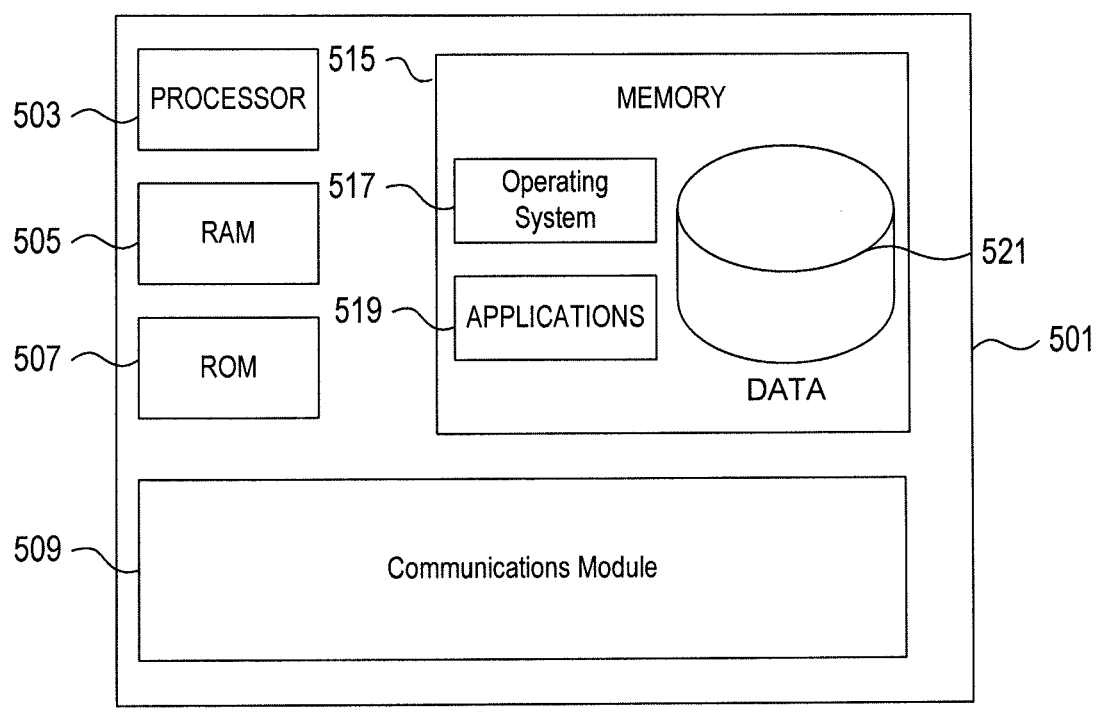
FIG. 5 shows an illustrative operating environment in which various aspects of the embodiments may be implemented.

FIG. 5 illustrates an example of computing platform 501 for supporting Context Server 215 or devices 204-209 that may be used according to one or more illustrative embodiments. Computing platform 501 is only one example of a suitable computing environment and is not intended to suggest any limitation as to the scope of use or functionality of the embodiments. Computing platform 501 should not be interpreted as having any dependency or requirement relating to any one or combination of components shown in the illustrative computing platform 501.

The embodiments are operational with numerous other general purpose or special purpose computing system environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Computing platform 501 may have a processor 503 for controlling overall operation of the computing platform 501 and its associated components, including RAM 505, ROM 507, communications module 509, and memory 515. Computing platform 501 typically includes a variety of computer readable media. Computer readable media may be any available media that may be accessed by computing platform 501 and include both volatile and nonvolatile media, removable, and non-removable media. By way of example, and not limitation, computer readable media may comprise a combination of computer storage media and communication media.

Computer storage media may include volatile and nonvolatile, removable and non-removable media implemented in any method or technology for storage of information such as computer readable instructions, data structures, program modules or other data. Computer storage media may include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 501.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 505 may include one or more are applications representing the application data stored in RAM memory 505 while the computing device is on and corresponding software applications (e.g., software tasks), are running on the computing platform 501.

Communications module 509 may include an interface to communicate with a wireless gateway (e.g., gateways 211-212), SMS aggregator 213, or directly with a wireless carrier network.

Software may be stored within memory 515 and/or storage to provide instructions to processor 503 for enabling computing platform 501 to perform various functions, e.g., processes 600-1100 as shown in FIGS. 6-11, respectively. For example, memory 515 may store software used by computing platform 501, such as an operating system 517, application programs 519, and an associated database 521. Alternatively, some or all of the computer executable instructions for computing platform 501 may be embodied in hardware or firmware (not explicitly shown).

Database 521 may provide storage of electronic content for a mapping a user to a device type or for storing configuration information to pull and push content to the user. While database 521 is shown to be internal to computing platform 501, database 521 may be external to computing platform 501 with some embodiments.

Additionally, one or more application programs 519 used by the computing platform 501, according to an illustrative embodiment, may include computer executable instructions for invoking user functionality related to communication including, for example, email, short message service (SMS), and voice input and speech recognition applications.

Embodiments of the invention may include forms of computer-readable media. Computer-readable media may include any available media that can be accessed by a computing platform 501. Computer-readable media may comprise storage media and communication media. Storage media include volatile and nonvolatile, removable and non-removable media implemented in any method or technology for storage of information such as computer-readable instructions, object code, data structures, program modules, or other data. Communication media may include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the embodiments is contemplated. For example, aspects of the method steps disclosed herein may be executed on a processor on a computing platform 501. Such a processor may execute computer-executable instructions stored on a computer-readable medium.

As understood by those skilled in the art, the steps that follow in the Figures may be implemented by one or more of the components in FIGS. 2 and 5 and/or other components, including other computing devices.

Figure 6:
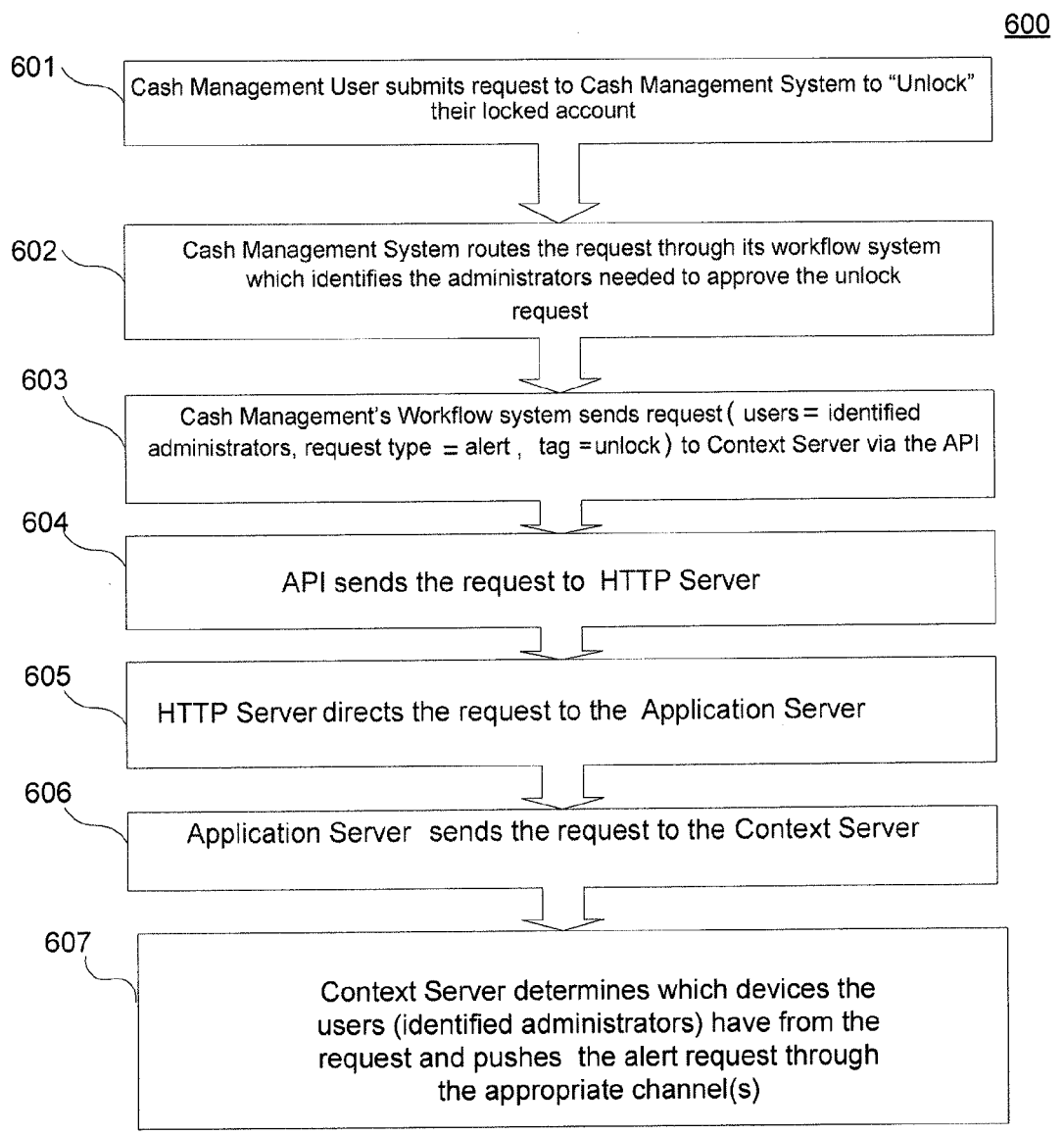
FIG. 6 shows a flow diagram in which customer requests that an account be unlocked in accordance with various aspects of the embodiments.

FIG. 6 shows flow diagram 600, in which a customer requests that an account be unlocked as illustrated in FIGS. 3 and 4 and in accordance with various aspects of the embodiments. Flow diagram 600 depicts a scenario in which a bank corporate treasury user is locked out of the user's cash management account. For the account to be unlocked, two of the user's company account administrators must approve the unlock request. The unlock request needs to be delivered to the account administrator's mobile device(s), which may be one of different types of mobile devices, e.g., devices 204-209. The administrator can then use the cash management mobile application on the administrator's device to approve and unlock the user's accounts.

In the flow diagrams shown in FIGS. 6-12, the user may change in a scenario as the scenario progresses. For example, in flow diagram 600, the user initially corresponds to the cash management user. Subsequently, the administrator becomes the user in order to approve the unlocking of the account for the cash management user.

At block 601 a cash management user submits a request to the cash management system (which is included in the infrastructure as business process 101 as shown in FIG. 1) to unlock the user's locked account (corresponding to screenshots 301-304 as shown in FIG. 3). The cash management system routes the request through its workflow and identifies the administrators needed to approve the unlock request at block 602.

The cash management's workflow then sends an alert request, in which the appropriate administrators are identified via the API at block 603, and consequently the API sends request 251 (as shown in FIG. 2) to HTTP Server 214 at block 604. HTTP Server 214 sends request 253 at block 605 to application server 211, which consequently sends the request to Context Server 215 at block 606.

Context Server 215 determines which devices the users (identified administrators) have from the request and pushes the alert request through the appropriate channel(s) at block 607. For different device types, the request may be directed differently. For example, with certain devices 205, the push may be sent through an External Wireless Gateway 212 to a Network Operations Center 210. With other devices 204, the push may be sent through a Wireless Gateway 211. With another device 207, the push is sent directly to device 207 through the wireless network and processed by client component 257. The pushes may also be sent securely and are logged.

Figure 7:
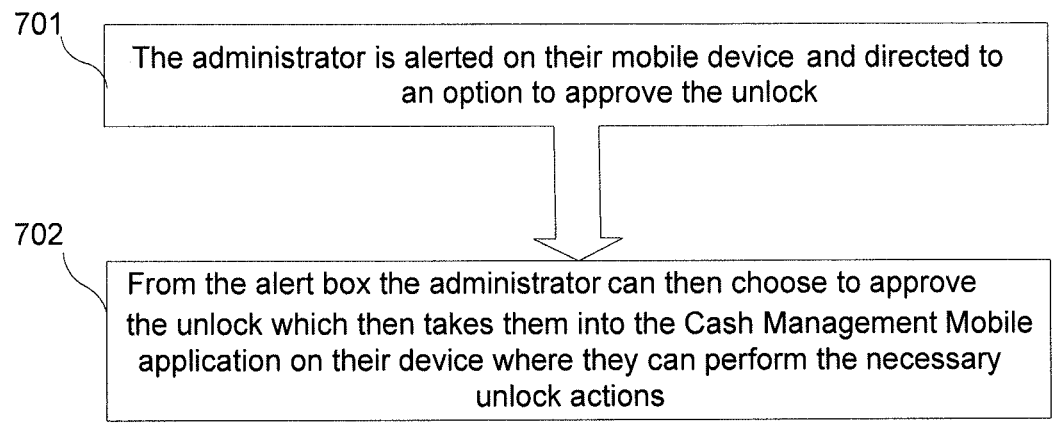
FIG. 7 shows a continuation of the flow diagram shown in FIG. 6 in accordance with various aspects of the embodiments.

FIG. 7 shows a continuation of flow diagram 600 shown in accordance with various aspects of the embodiments. Context Server 215 sends an alert at block 701 to the mobile device of the administrator (corresponding to screenshot 401 as shown in FIG. 4) with an option to approve the unlock request. At block 702 the administrator can chose to approve the unlock (corresponding to screenshot 403). The cash management mobile application generates a selectable display so that the administrator can perform the necessary actions to unlock the selected account.

Figure 8:
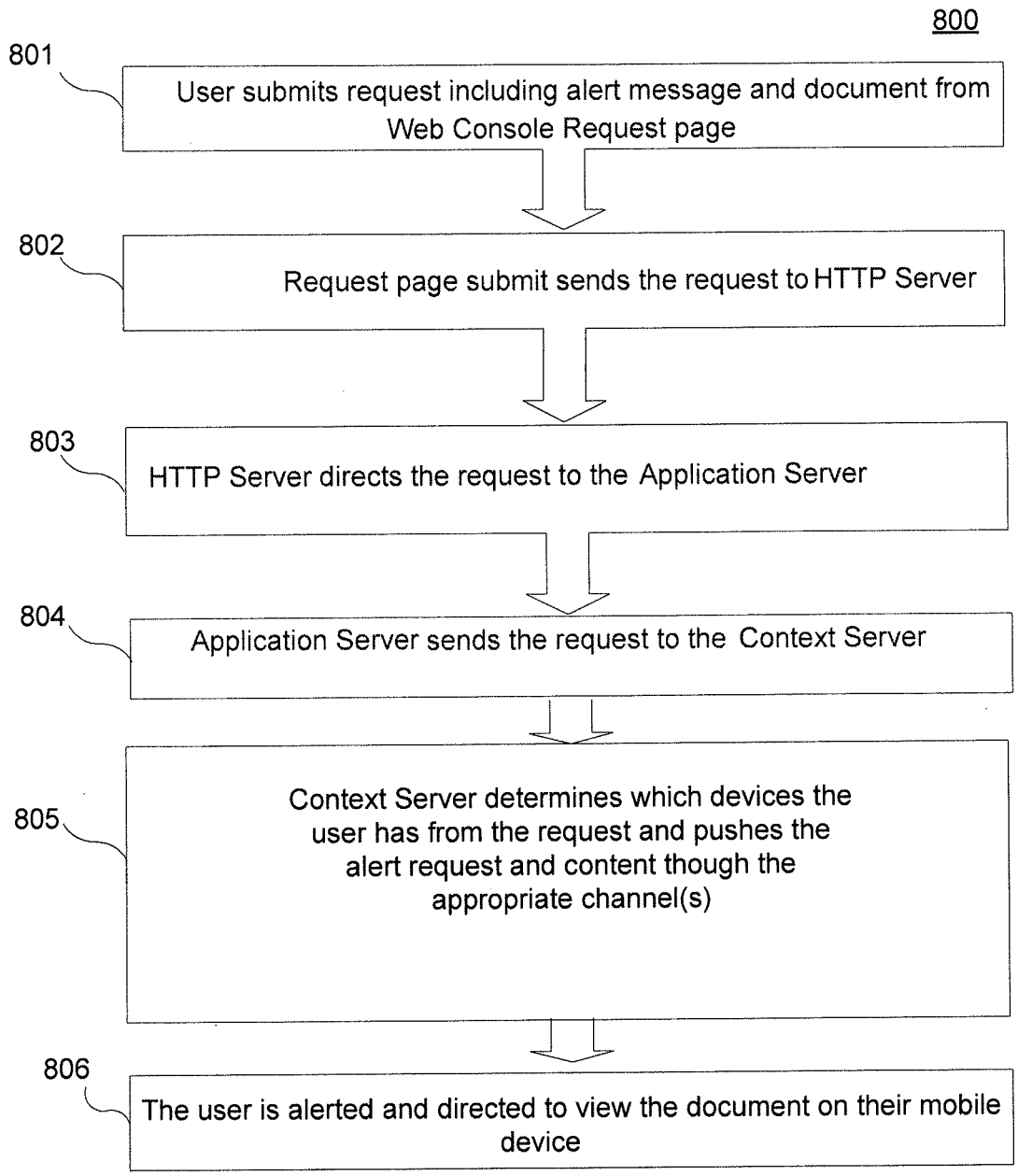
FIG. 8 shows a flow diagram in which a bank loan officer wants to push an alert and corresponding document to a customer in accordance with various aspects of the embodiments.

FIG. 8 shows flow diagram 800 in which a bank loan officer (the user) wants to push an alert and corresponding document to a customer in accordance with various aspects of the embodiments. Flow diagram 800 may depict a scenario in which a bank loan officer wants to push an alert and corresponding document to a customer for the customer's review. The alert and document content are delivered to the customer's mobile device(s), which may be one of different types of mobile devices, e.g., devices 204-209.

The bank loan officer initiates request 251 to system 200 at block 801, where the request includes an alert message and document content from a Context Request page (not explicitly shown) that is displayed on a Web console. Consequently the API forwards request 251 (as shown in FIG. 2) to HTTP Server 214 at block 802. HTTP server 214 sends request 253 at block 803 to application server 211, which consequently sends the request to Context Server 215 at block 804.

Context Server 215 determines which devices the user has from the request and pushes the alert request and content through the appropriate wireless channels at block 805. For different device types, the request and content may be directed differently. For example, with certain devices 205, the push may be sent through an External Wireless Gateway 212 to a Network Operations Center 210. With other devices 204, the push may be sent through a Wireless Gateway 211. With another device 207, the push is sent directly to device 207 through the wireless network and processed by client component 257. The pushes may also be sent securely and are logged.

The customer (user) is alerted and directed to view the document on the user's device at block 806.

Figure 9:
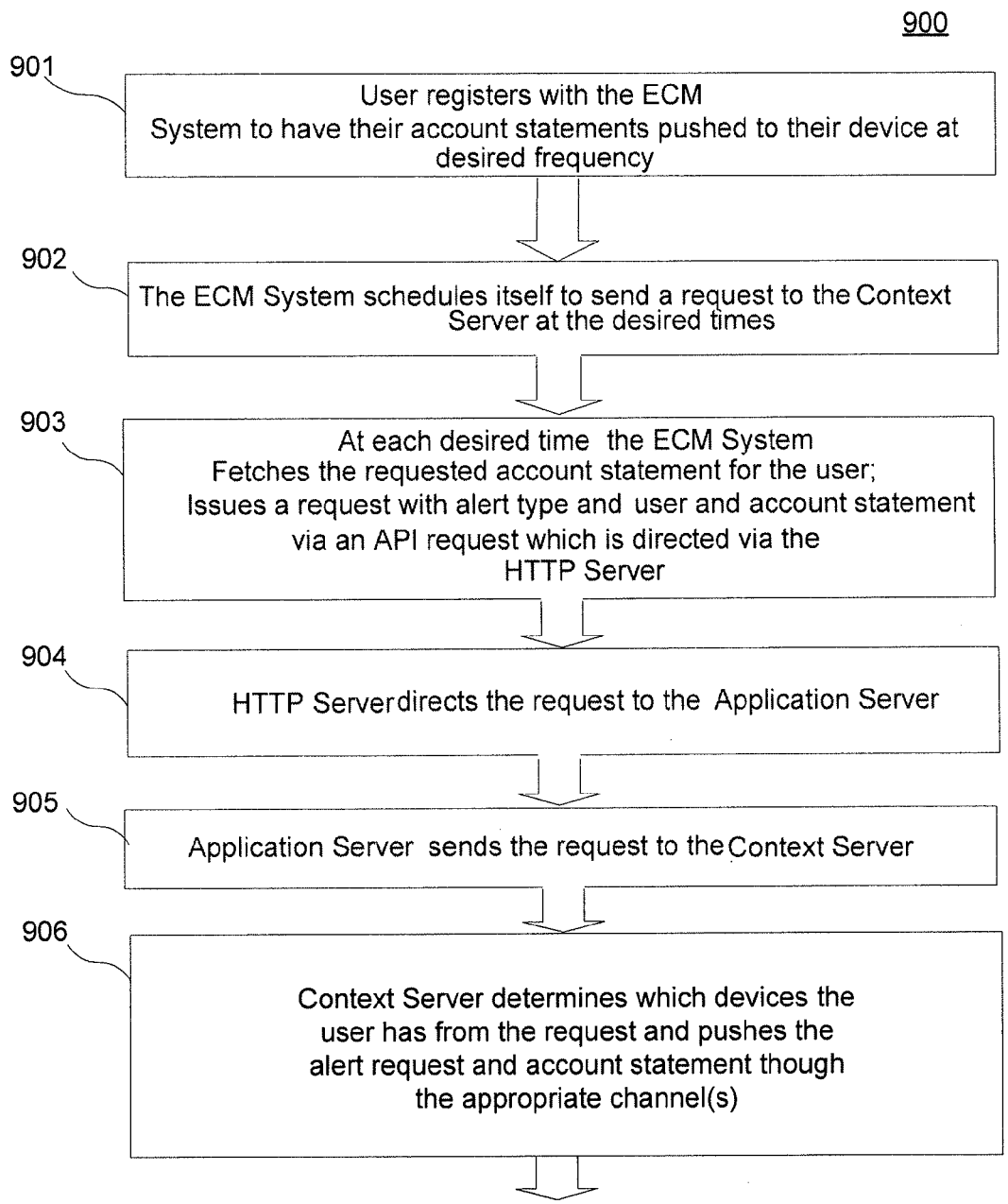
FIG. 9 shows a flow diagram in which a customer registers to have alerts and periodic account statements pushed to the customer's communication device in accordance with various aspects of the embodiments.

FIG. 9 shows flow diagram 900 in which a customer registers to have alerts and periodic account statements push to the customer's communication device in accordance with various aspects of the embodiments. Flow diagram 900 may depict a scenario in which a bank customer registers to have alerts and periodic account statements pushed to the customer's device(s). The alert and account content are delivered to the customer's mobile device(s), which may be one of different types of mobile devices, e.g., devices 204-209.

At block 901, a customer (user) registers with the enterprise content management (ECM) system (which may support business process 101 as shown in FIG. 1) to have account statements pushed to the customer's device at a desired frequency (e.g., every month). The ECM system schedules itself at block 902 to send request 251 to Context Server 215 at the desired times (e.g., on the first business day of each month).

At each desired time, ECM system fetches the request account statement for the user at block 903. The ECM system then issues request 251 with an alert type, user identification, and account statement via an API request, which is directed via HTTP server 214. HTTP server 214 sends request 253 at block 904 to application server 211, which consequently sends the request to Context Server 215 at block 905.

Context Server 215 determines which devices the user has from the request and pushes the alert request and account statement through the appropriate wireless channels at block 906. For different device types, the request and content may be directed differently. For example, with certain devices 205, the push may be sent through an External Wireless Gateway 212 to a Network Operations Center 210. With other devices 204, the push may be sent through a Wireless Gateway 211. With another device 207, the push is sent directly to device 207 through the wireless network and processed by client component 257. The pushes are typically sent securely and are logged.

FIG. 10 shows a continuation of flow diagram 900 in accordance with various aspects of the embodiments. At block 1001 the user (customer) is alerted and is directed to view the account statement on the customer's device. For devices that do not handle document display automatically, a context client library may be invoked to display the account statement via the ContentHandler API.

Figure 11:
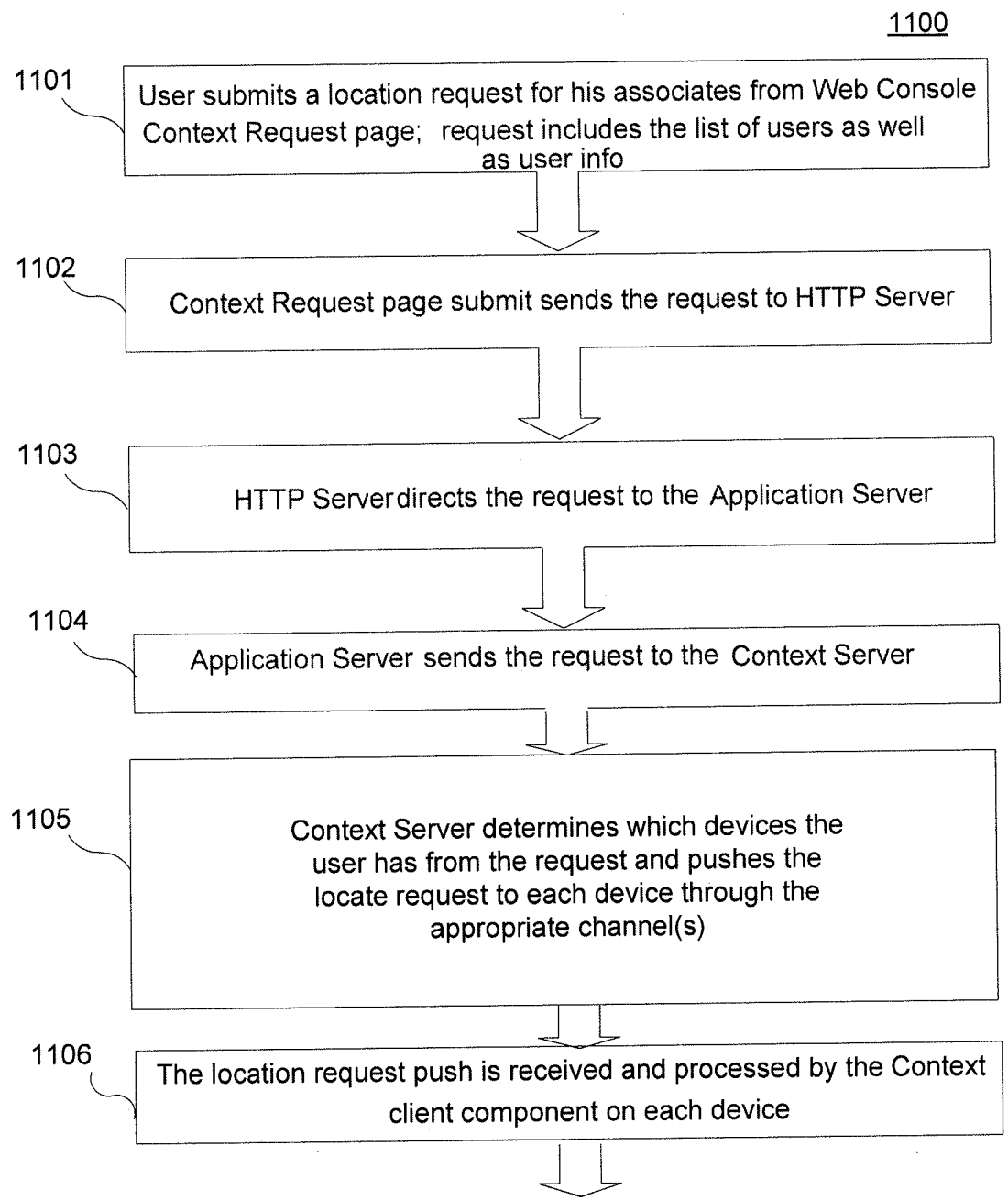
FIG. 11 shows a flow diagram in which a manager wants to determine the locations of the manager's associates in accordance with various aspects of the embodiments.

FIG. 11 shows flow diagram 1100 in which a manager wants to determine the locations of the manager's associates in accordance with various aspects of the embodiments. Flow diagram 1100 depicts a scenario in which a bank manager wants to determine the location of the manager's associates after an emergency event forces an evacuation of an office building. The bank manager uses a Web console to send a location request to the mobile devices of the associates via system 200. The associates may have different mobile devices, e.g., devices 204-209.

At block 1101, the banking manager (user) submits a location request for the manager's associates through a Context Request page that is displayed on the manager's Web console. However, embodiments also support the manager initiating a request through another type of device, including devices 204-209. The request may include a list of users (associates) as well as user information. Consequently, a application executing on the Web console initiates request 251 at block 1102 with a location type and user identifications of the associates and manager via an API request, which is directed via HTTP server 214. HTTP server 214 sends request 253 at block 1103 to application server 211, which consequently sends the request to Context Server 215 at block 1104.

Context Server 215 determines which devices the user has from the request and pushes the location request to each device through the appropriate wireless channels at block 1105. For different device types, the request and content may be directed differently. For example, with certain devices 205, the push may be sent through an External Wireless Gateway 212 to a Network Operations Center 210. With other devices 204, the push may be sent through a Wireless Gateway 211. With another device 207, the push is sent directly to device 207 through the wireless network and processed by client component 257. The pushes are typically sent securely and are logged.

At block 1106, the location request push is received and processed by the client component 254-259 on each device of the manager's associates.

Figure 12:
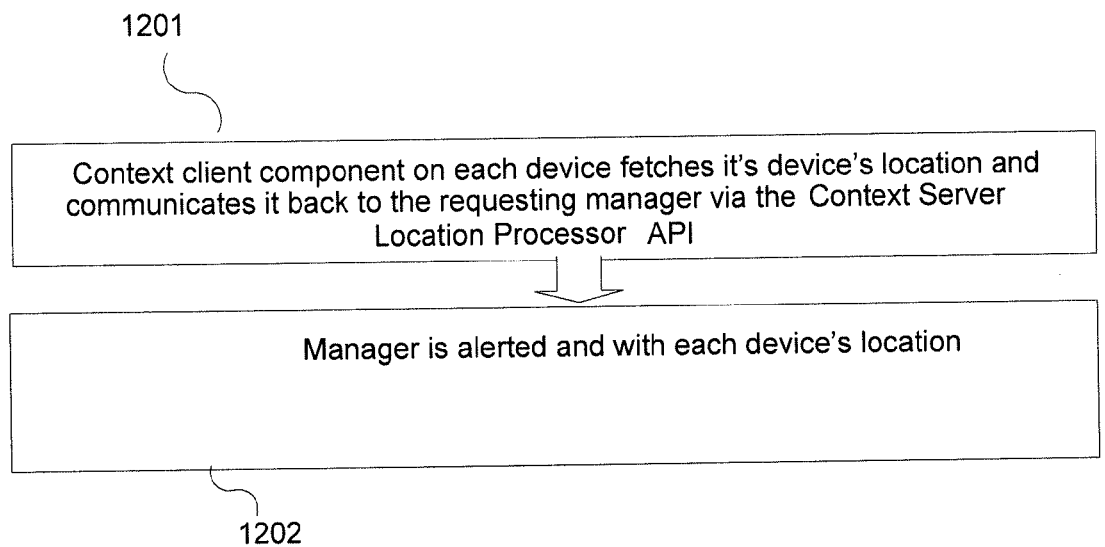
FIG. 12 shows a continuation of the flow diagram shown in FIG. 11 in accordance with various aspects of the embodiments.

FIG. 12 shows a continuation of flow diagram 1100 shown in accordance with various aspects of the embodiments. At block 1201 context client component 254-259 on each device of the manager's associates fetches its devices location and sends it back to the manager via Context Server 215 through the location processor API. The manager is then alerted with the location of each associate's device at block 1202.

Figure 13:
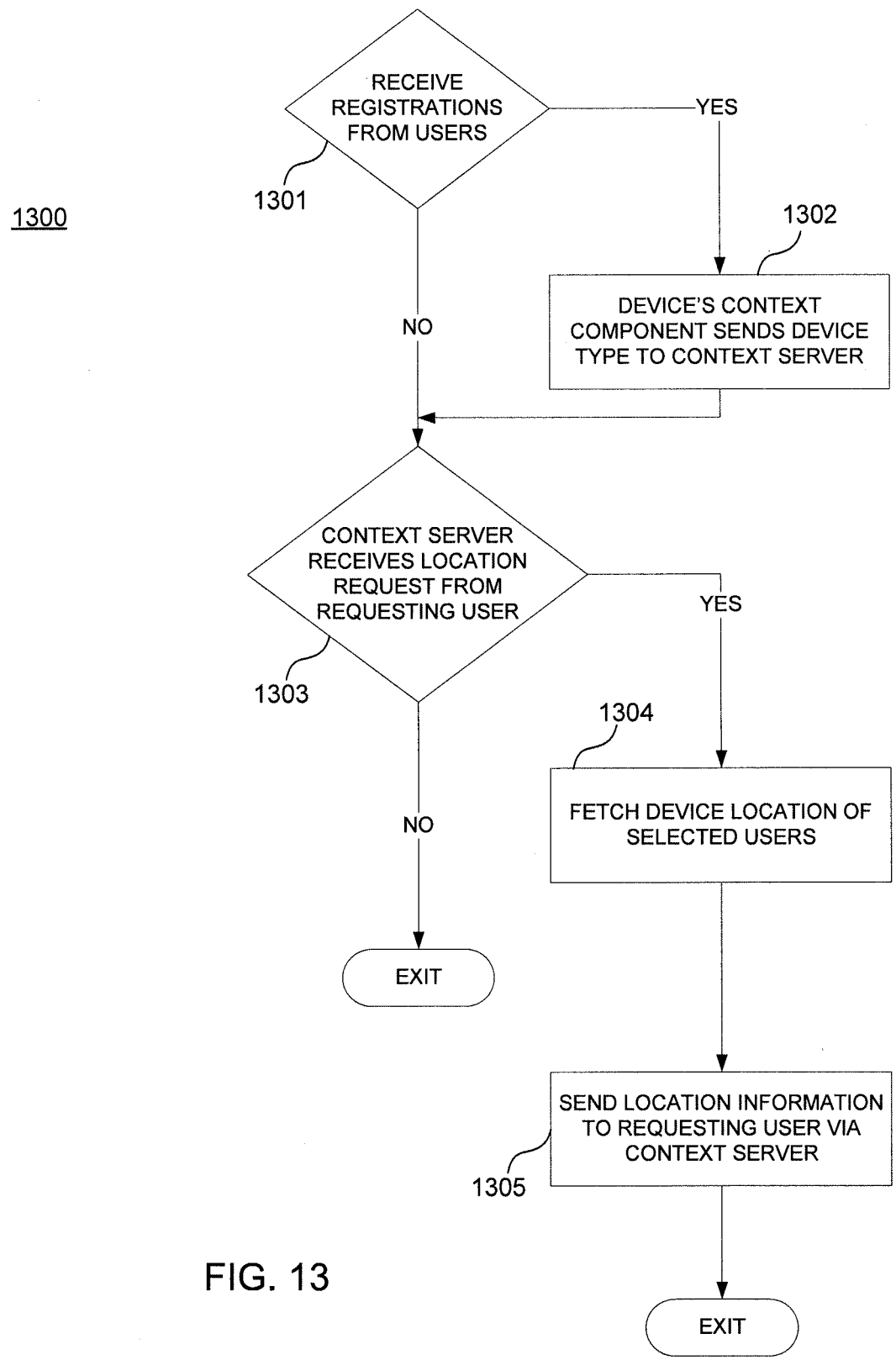
FIG. 13 shows a flow diagram for a client component in accordance with various aspects of the embodiments.

FIG. 13 shows flow diagram 1300 for a client component 254-259 in accordance with various aspects of the embodiments. With some embodiments, context client component 254-259 executes computing platform 501 as previously discussed.

At blocks 1301-1302 users register with Context Server 215 in order to provide the device types of each user's device. However, registrations typically occur at different times when user devices become active.

When a user (e.g., a manager) requests a location request at block 1303, device locations of selected users (e.g., associates) are fetched at block 1304, and the location information is provided to the requesting user at block 1305.

Figure 14:
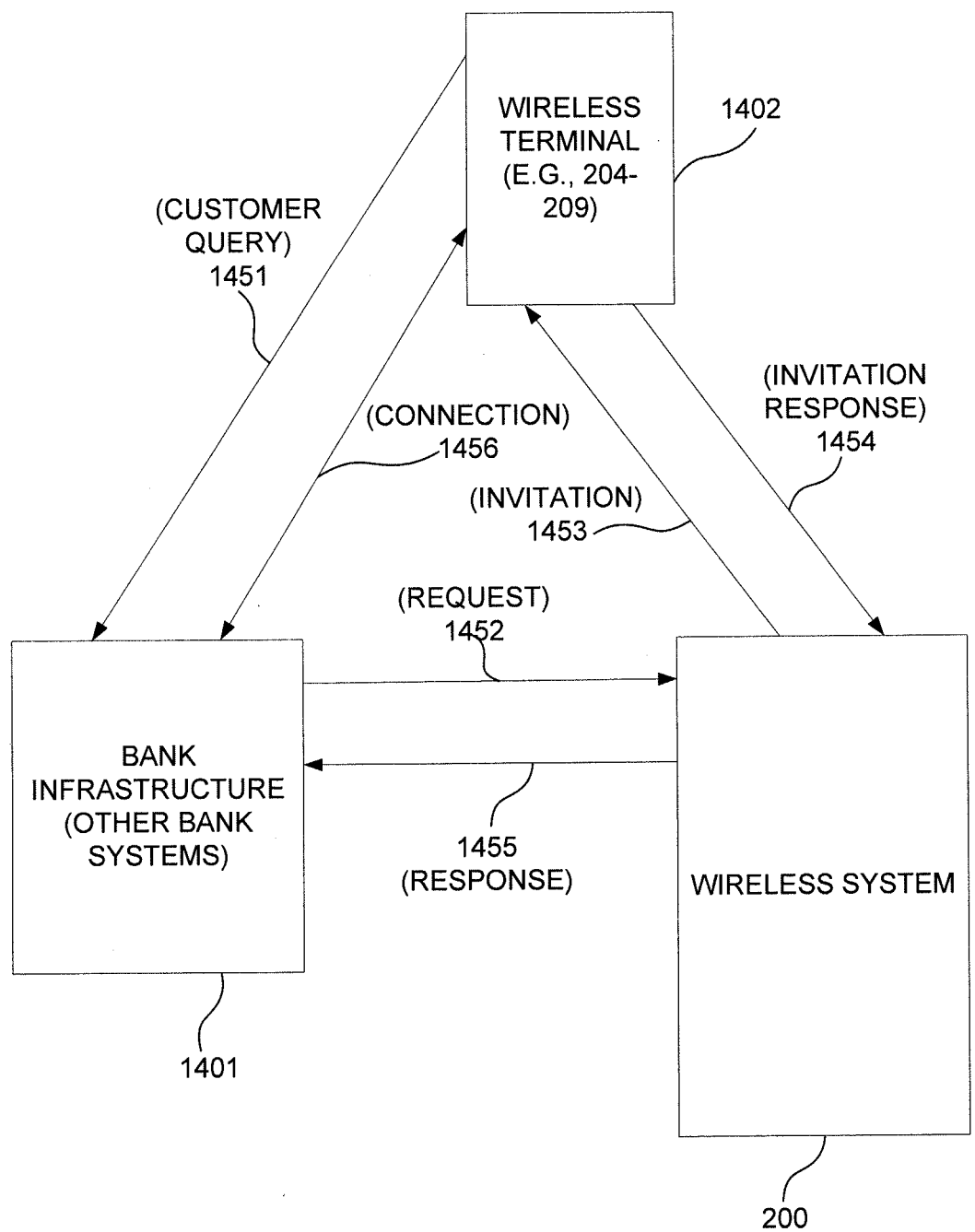
FIG. 14 shows a system in which a customer generates a query in accordance with various aspects of the embodiments.

FIG. 14 shows a system in which a customer generates a query in accordance with various aspects of the embodiments. A bank customer initiates a query request to bank infrastructure 1401 through terminal 1403 about a general question (e.g., identifying a branch/ATM location through a web service call or by text messaging through an automated system). Consequently, terminal 1402 generates query message 1451 to bank infrastructure 1401. Bank infrastructure 1401 may include different banking systems that are separate from system 200 or may be incorporated into system 200 as shown in FIG. 2. With some embodiments, bank infrastructure 1401 may receive query message 1451 over a communication channel without interacting with system 200, and consequently without message 1451 being transported via gateway 211 or 212.

Request 1452 (which may correspond to request 251 as shown in FIG. 2) is then sent from infrastructure 1401 to wireless system 200 with a user identification and query information that are contained in query message 1451. Wireless system 200 (e.g., context server 215 as shown in FIG. 2) accesses customer profile information to determine the device type of terminal 1402 and the query treatment for the customer. For example, the customer profile information may provide the customer's account type and may be indicative of whether the customer prefers human interaction with a bank representative. Based on the customer profile information, context server 215 may generate invitation message 1453 with contact information (e.g., a telephone number for the customer to call in order to reach a bank representative) and send message 1453 to terminal 1402 through the appropriate type of communication channel. While FIG. 14 shows that terminal 1402 generates message 1452 and receives invitation message 1453, messages 1452 and 1453 may be associated with different terminals (i.e., the customer generates the query request and receives the query response on different terminals).

While FIG. 14 shows system 200 sending invitation message 1453, server 215 may determine that only general information (e.g., the location of a bank branch or ATM) be sent to terminal 1402 without inviting the customer to communicate directly with the bank representative. The general information may be based on specific information associated with terminal 1402, such as the terminal's location so that the closest ATM or bank branch is provided.

If the customer is invited to communicate directly with a bank representative based on the customer profile, the customer may indicate whether bank representative should set up a connection to customer's wireless terminal (e.g., chat session or telephone call), as indicated by invitation response 1454. System 200 provides invitation response 1455 to infrastructure 1401, and the bank representative may then initiate non-gateway connection 1456 to terminal 1403 without further interaction with system 200. Alternatively, the customer may prefer to initiate a connection using contact information provided in invitation 1453 rather than having the bank representative call the customer.

Figure 15:
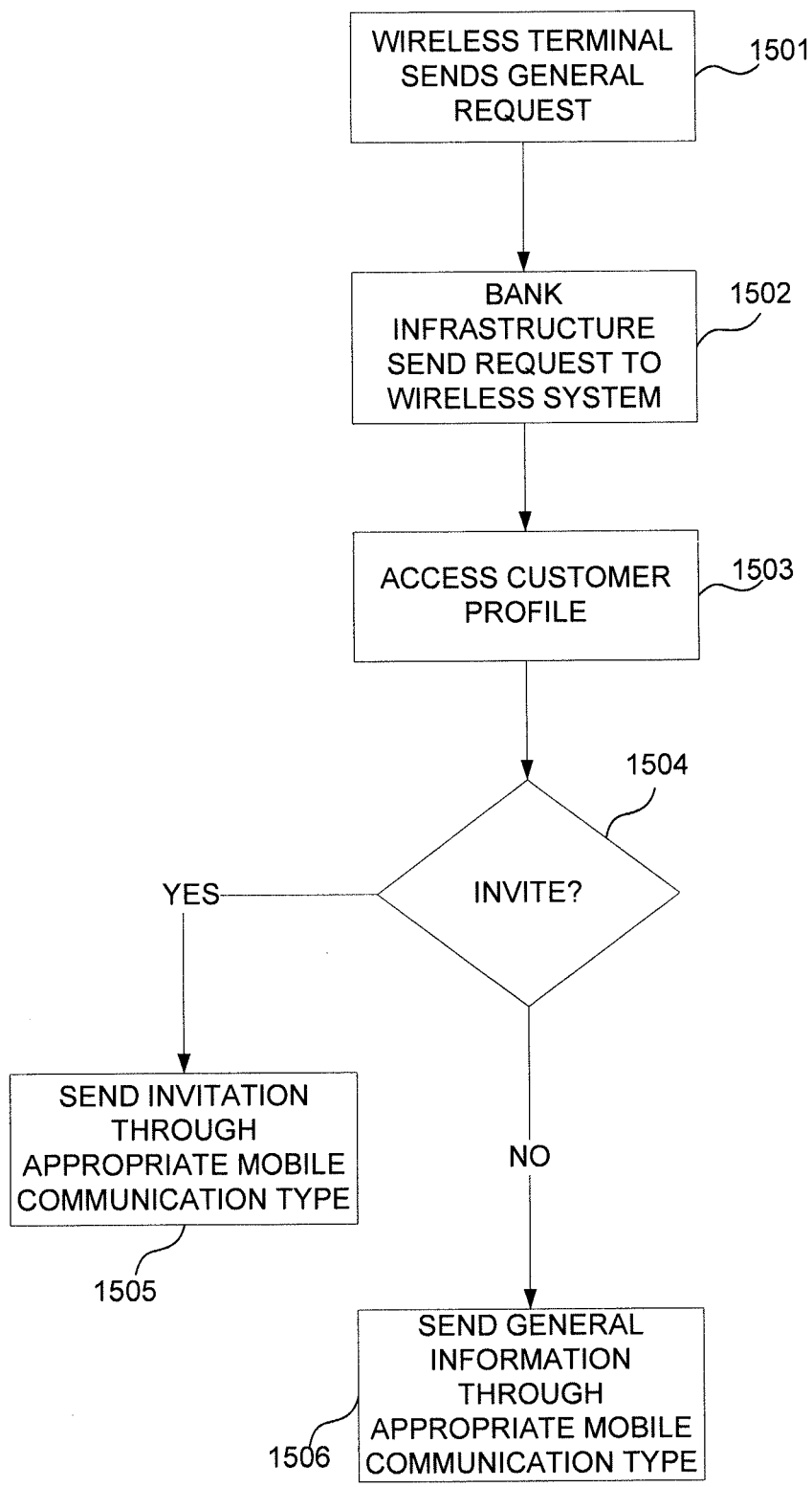
FIG. 15 shows a flow diagram in which a customer generates a query in accordance with various aspects of the embodiments.

FIG. 15 shows flow diagram 1500 that is associated with FIG. 14 in which a customer generates a query in accordance with various aspects of the embodiments. At block 1501, terminal 1402 sends a general request to infrastructure 1401, which then sends request 1452 to system 200 at block 1502. The customer profile (e.g., stored at data repository 217 as shown in FIG. 2) is accessed at block 1503 to determine whether the customer should be invited to interact directly with a bank representative as determined at block 1504. If so, the customer is provided information that answers the query as well as contact information at block 1505 so that the customer can communicate with the bank representative. Also, as previously discussed, system 200 directs the invitation message through the appropriate communication channel type based on the device type. If system 200 determines that the customer should not be invited at block 1504, then only general information related to the query is sent to the customer at block 1506.

Figure 16:
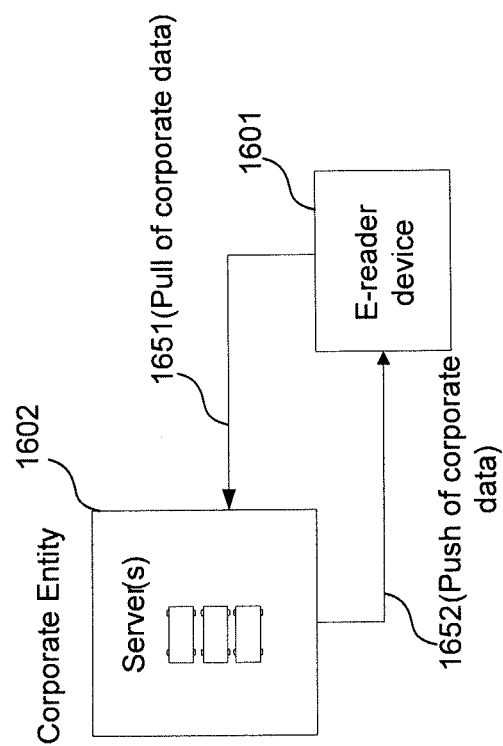
FIG. 16 shows a system flow for mobile content management in accordance with various aspects of the embodiments.

FIG. 16 shows a system flow for mobile content management in accordance with various aspects of the embodiments. With traditional systems, remote users (e.g., employees or associates) are often faced with the challenge of continually staying up to date on required training, product updates, and other critical learning opportunities while being asked to spend most of their time on the road.

Prior to leaving the office with traditional systems, users often have to search many documents all housed in different places throughout internal and external systems. Remote users cannot always access their company's networks while on the road so the remote users often resort to printing out critical documents prior to leaving the place of business. This approach often creates a conflict with efforts to reduce paper consumption. Hours of preparation and printing may be expended for each sales call in order to identify and find the right documents to support deals, learn about industries, and keep up with product information. Also there may be a need to keep all the documents in hard copy form so the employee does not have to rely on finding Wi-Fi signals for accessing the company's internal systems. These activities may not add value in a sales person's day and consequently decrease company productivity.

With an aspect of the embodiments, a consumer-focused product is migrated into an integrated corporate mobile filing system, allowing sales associates to have real-time access to critical documents while in a mobile environment, without being tethered to a laptop computer. Consequently, a new tool is provided for corporations or other organizations that provides value that traditional systems do not. The combination of a mobile reading device (e.g., device 1601 corresponding to device 209 as shown in FIG. 2) with an integrated internal system (corporate entity 1602 and corresponding to system 200 as shown in FIG. 2) for administering the management of the content on a device that does not currently exist with traditional systems. Even though corporate employees typically have to juggle hundreds of documents daily, corporate entity 1602 may support an employee when the employee is away from the office on sales calls or other business-related activities. For example, necessary or critical documents may be pushed to an employee's device automatically by a manager or other individual associated with an organization.

With an aspect of the embodiments, secure and user-friendly mobile device 1601 is dedicated to the needs of remote users (employees) (e.g., a global sales force, technicians, and repair personnel). Device 1601 leverages the e-ink technology so that an e-ink reader allows a user to access, manage and read documents without being "tethered" to a computer. Device 1601 allows for both user-initiated downloads from corporate entity 1602 (corresponding to pull of corporate data 1651) as well as corporate pushes by corporate entity 1602 (corresponding to push of corporate data 1652) in order to ensure that an employee is equipped with all the necessary information for the employee's job when they are away from the office. With an aspect of the embodiments, device 1601, which may function as a stand-alone device, is integrated with web platform 1602 that administers all pushes of information to device 1601.

Referring to FIG. 2, system 200 may include corporate entity 1602. According to an aspect of the embodiments, corporate entity 1602 may push updated documents to device 1601 when a previously-pulled document has been revised. For example, documents may be pushed to mobile device 1601 based on update configuration information (e.g., time of updating or frequency of updating documents).

With an aspect of the embodiments, technology is incorporated to display text on a screen of device 1601 in a way that is easily readable, even in sunlight. E-reader device 1601 may allow consumers to store large volumes of text in the form of books, magazines and newspapers. Device 1601 may support electronic paper, e-paper, or electronic ink display to mimic the appearance of ordinary ink on paper. Unlike a flat panel display, which uses a backlight to illuminate its pixels, electronic paper typically reflects light like ordinary paper and is capable of holding text and images indefinitely without drawing electricity, while allowing the image to be changed later.

Pushing content from corporate entity 1602 to device 1601 may offer a number of capabilities for a business user as well as reduce paper consumption. For example, an associate may quickly and easily obtain and store product updates and industry documentation. Managers may also ensure that associates have necessary updated information in an essentially real-time environment by initiating a push for the selected information to selected remote users. Consequently, associates can review draft documents and make notes for changes, quickly and easily access and store a multitude of newspapers and industry magazines, and access mobile device 1601 without a Wi-Fi hot spot. Moreover, remote technicians can access volumes of instructional manuals.

Figure 17:
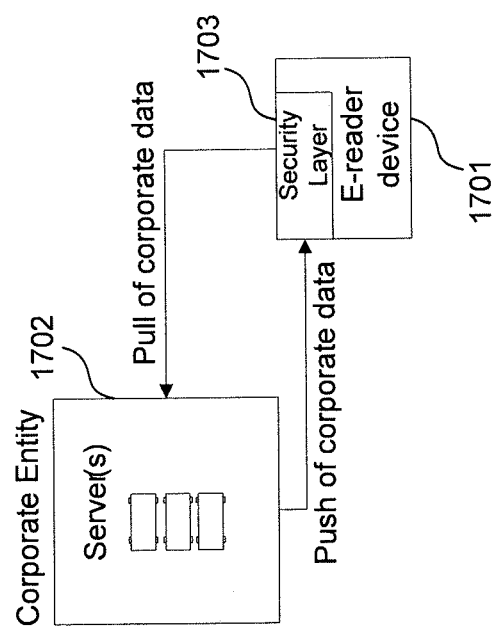
FIG. 17 shows a system flow for mobile content management in accordance with various aspects of the embodiments.

FIG. 17 shows a system flow for mobile content management in accordance with various aspects of the embodiments. Corporate entity 1702 and device 1701 are similar to corporate entity 1602 and device 1601; however, security management is also supported by security layer component 1703 in conjunction with corporate entity 1702. For example, with some embodiments, security management verifies that a user has permission to the selected documents, the actual user is really the identified user, and the content is sufficiently encrypted when the content is pushed or pulled.

Figure 18:
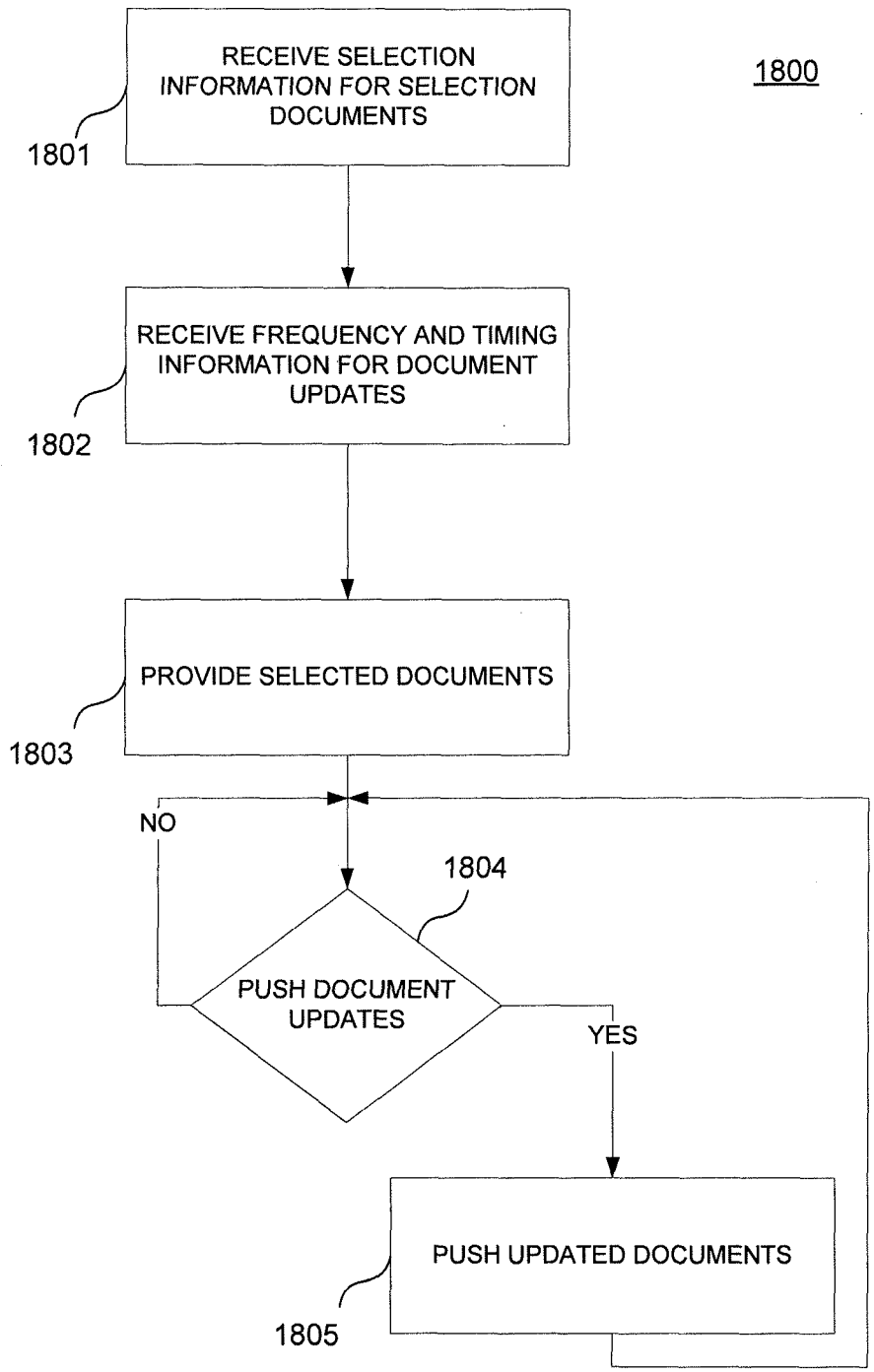
FIG. 18 shows a flow diagram for mobile content management in accordance with various aspects of the embodiments.

FIG. 18 shows flow diagram 1800 for mobile content management in accordance with various aspects of the embodiments. Process 1800 may begin when a user, e.g., an associate of a business, is ready to prepare for a sales call. The associate may access an internal website and select the documents that are needed from a drop down menu that is displayed on device 1601. In addition, the associate may choose the frequency and timing for any push of content to the mobile content manager of device 1601, e.g., client component 259 as shown in FIG. 2. The requested documents may be quickly downloaded (pull) to the mobile device 1601 and may be available for reading. The selected document may be subsequently pushed when the document has been updated. For example, the document may be updated on a daily basis or may be updated at a given time. Also, with some embodiments, another user (e.g., a manager) may request that a selected document be pushed to the remote user (e.g., an associate) at a selected time to keep the remote user updated with current information.

Referring to FIG. 18, configuration information is received by corporate entity 1602 from device 1601 for pulling and/or pushing content at block 1801. For example, the user may enter selected documents through a document menu (not explicitly shown). In addition, the user may enter information for updating the content, where the content is pushed by corporate entity 1602 at block 1802. Alternatively, with some embodiments, the configuration information may be automatically entered by client component 259 so that the user is not burdened to enter the information.

The selected documents (content) are then pushed to device 1601 at block 1803. Process 1800 subsequently determines whether the selected documents should be updated at block 1804. If so, the documents are pushed at block 1805. Referring to FIG. 2, for example, the updated documents may be pushed from Context Server 215 via a wireless carrier network (tier 203) to e-reader device 209.

According to an additional or alternative aspect, e-ink reader users may elect to subscribe to information feeds such as information streams, newspapers and other documents that are periodically or aperiodically updated. The subscriptions may be processed by a document provider such that when an update occurs or new information is available, the data may be automatically pushed to a user's e-ink reader. In one or more arrangements, the information may be provided to a user's e-ink reader rather than other devices associated with the user based on the nature of the information and the readability of documents on e-ink readers. For example, newspapers or other documents with significant amounts of text and thus, a corporate system may automatically select to transmit the newspaper or other document to the e-ink reader rather than, for example, a smartphone device. Alternatively or additionally, the user may select the device to receive the subscribed information. Further, the schedule upon which information is updated or pushed to the user's device may be defined by the user or may be automatically defined based on when the information is updated or some other schedule.

With an aspect of the embodiments, content, e.g., one or more pushed documents from context server 215 may be processed by an application executing at a user's mobile device in a secure manner. As will be discussed, an alert indication may be sent to the mobile device when the one or more documents are available. The documents may be downloaded over a secure channel if the user affirmatively responds to the alert indication and may be further encrypted and stored in an application file store. The user may subsequently select one of the documents from a document list so that the selected document may be decrypted and displayed to the user.

With an aspect of the invention, stored documents in the application file store may be deleted if the operating system has been compromised, if the user is not associated with the business providing the documents, or if the user device has been lost or stolen.

Figure 19:
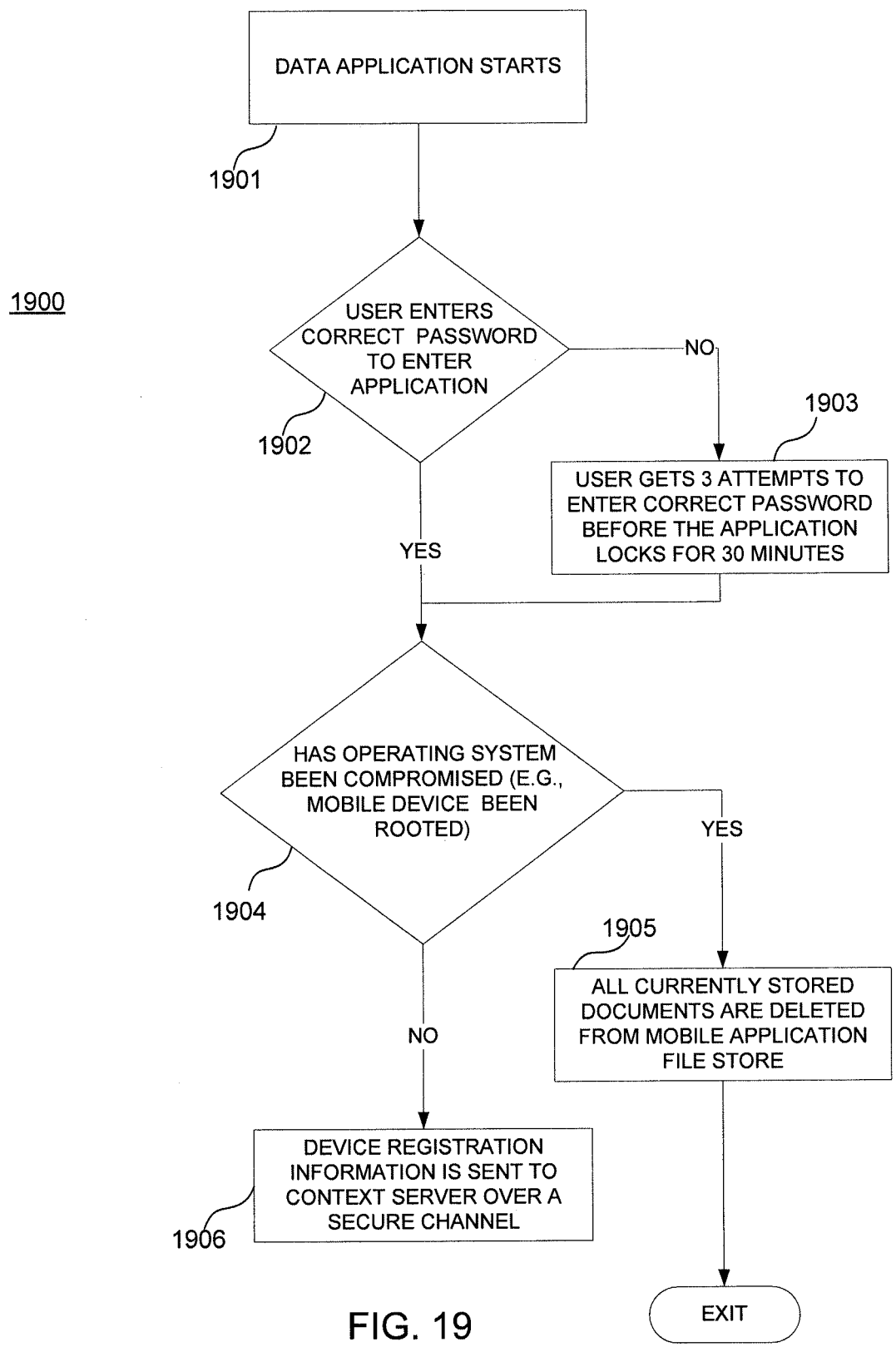
FIG. 19 shows a flow diagram for initiating a pushed document application in accordance with various aspects of the embodiments.
Figure 24:
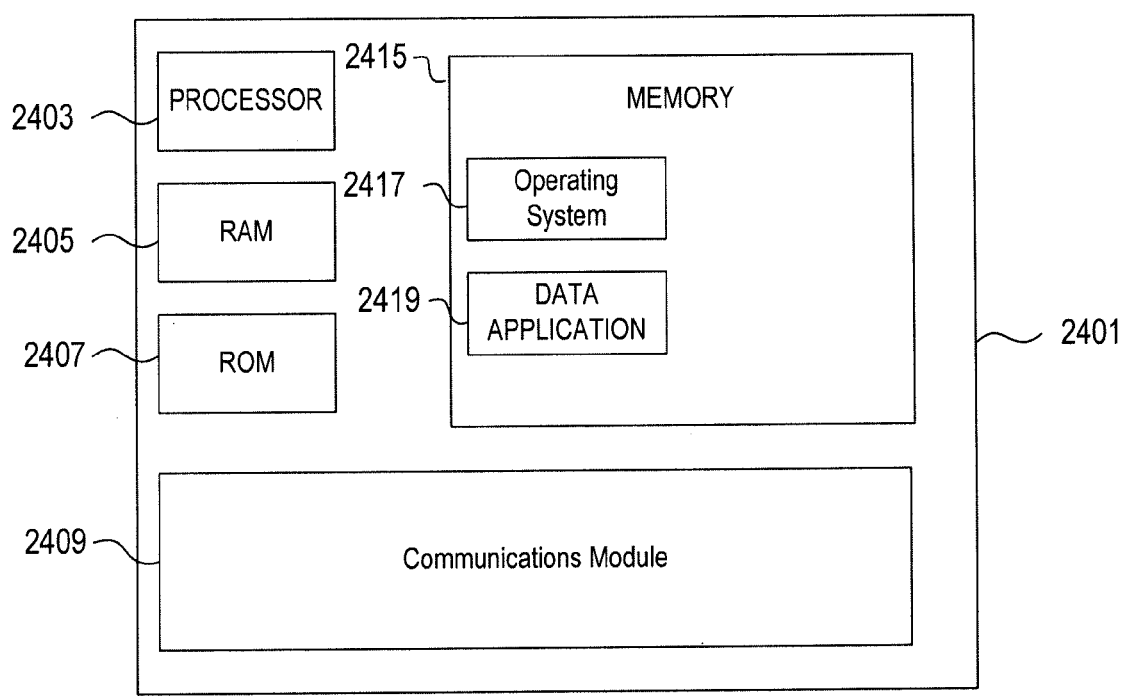
FIG. 24 shows an apparatus that executes a data application for receiving a pushed document in accordance with various aspects of the embodiments.

FIG. 19 shows flow diagram 1900 for initiating a data application at block 1901 in accordance with various aspects of the embodiments. For example, the data application (corresponding to data application 2419 as shown in FIG. 24) may be one of a plurality of mobile applications executing on a user's mobile device, e.g., a mobile phone or a personal digital assistant. Application software (often referred to as an "app") is typically computer software designed to help a user to perform singular or multiple related specific tasks. Examples include enterprise software, accounting software, office suites, graphics software and media players. The data application may process a collection of data including documents and/or information about a business customer.

At block 1902, the user enters a password in order to continue normal execution of the data application. In accordance with some embodiments, the user must enter the correct password within a predetermined number of attempts (e.g., three) at block 1003. Otherwise, the data application may be locked for a predetermined time duration (e.g., 30 minutes) before the user can attempt to access the data application.

At block 1904, the data application determines whether the operating system running on the user's device has been compromised, e.g., whether the user's device has been rooted. Rooting may refer to a process that allows a user of a mobile device running an operating system to attain privileged control (often referred as "root access") within the operating system. For example, rooting may enable an application to have direct access to the flash memory chip on the mobile terminal or enabling the modification of the operating system. Also, rooting may enable an application to obtain additional system and hardware rights and functionality such as rebooting of the mobile device, control of hardware components or access to backup utilities. Rooting may be similar to jailbreaking on devices running the operating system, overcoming limitations that the carriers and manufacturers imposed on such phones.

If the data application determines that the operating system has been compromised, all currently stored documents may be deleted from mobile application file store at block 1905. For example, the data application may have an allocated memory space that is dedicated to the data application and that may be segregated from allocated memory space of other applications running on the user's device. As will be further discussed, documents may have been previously downloaded from context server 215 (as shown in FIG. 2) during previous execution of the data application. Otherwise, a registration message is sent to context server 215 over a secure channel at block 1906. The registration message may identify the device and/or user by an identification value.

With some embodiments, a secure channel between context server 215 and the user's mobile device 204-209 may be supported in either direction. For example, embodiments may utilize transport layer security (TLS) or secure sockets layer (SSL), which are cryptographic protocols that provide communication security over public and private networks such as the Internet. TLS and SSL encrypt the segments of network connections above the transport layer, using symmetric cryptography for privacy and a keyed message authentication code for message reliability. As will be discussed, device registration messages (block 1906 as shown in FIG. 19), registration response messages (block 2001 as shown in FIG. 20), alert messages (block 2103 as shown in FIG. 21), document request messages (block 2203 as shown in FIG. 22), and pushed document content (block 2204 as shown in FIG. 22) may be sent over the secure channel.

Figure 20:
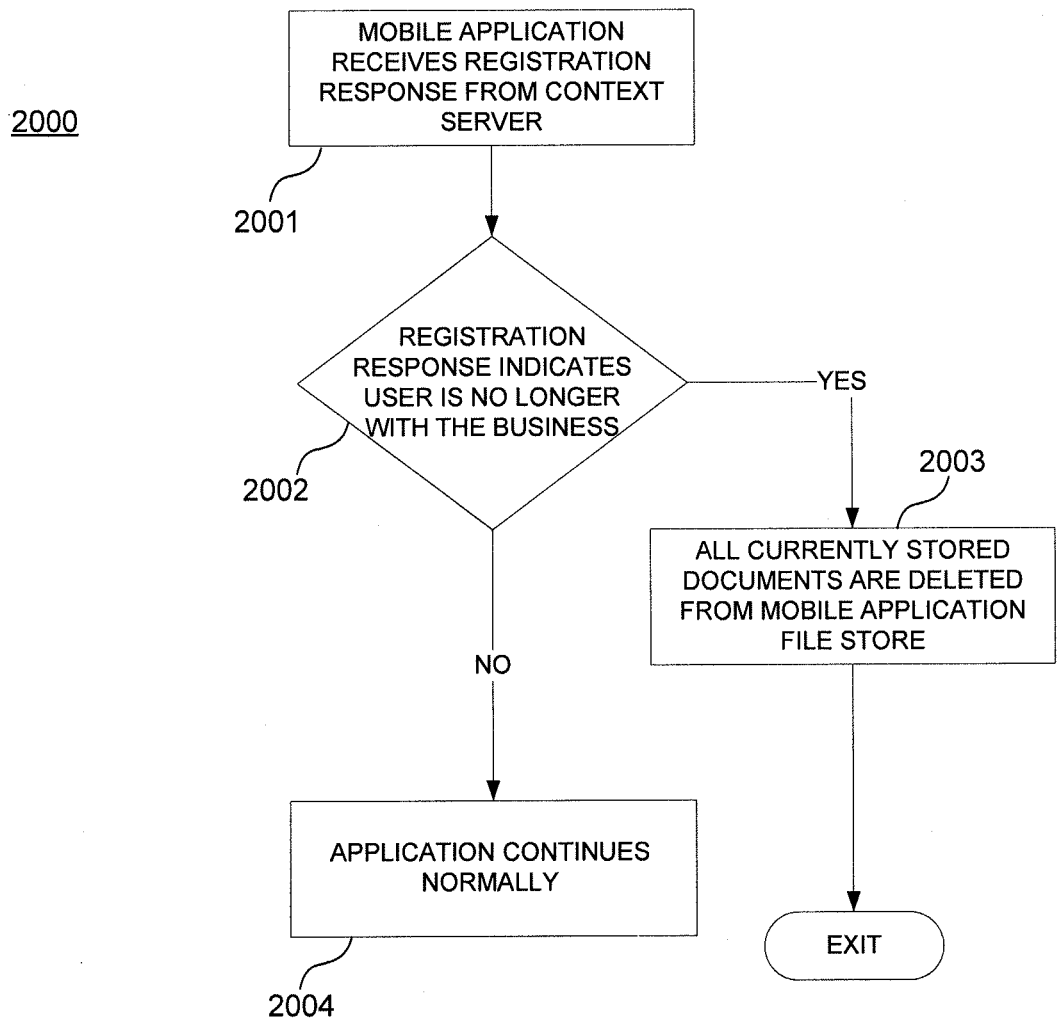
FIG. 20 shows a flow diagram for processing a registration response by a data application in accordance with various aspects of the embodiments.

FIG. 20 shows flow diagram 2000 for processing a registration response by the data application in accordance with various aspects of the embodiments. At block 2001, the user device receives the registration response from context server 215 in response to the device registration information sent at block 1906.

At block 2002, the data application processes the registration response to determine whether the response indicates that the user is with the content-providing business. Content may include one or more documents and/or customer information or data. For example, the user may be a business associate, business customer, or third party business partner that provides services to the business. If the data application determines that the user is not properly associated with the business at block 2003, the data application may prevent the user from accessing any stored information provided by the data application. For example, all stored documents may be deleted from the mobile application file store. However, with some embodiments, the user may be prevented from accessing the stored documents without deleting stored documents. For example, the documents may be encrypted and the decryption key may not be accessible to the user or to everyone (e.g., locked) so that the stored documents cannot be read by the user. Otherwise, the data application continues to execute normally at block 2004. For example, as will be discussed, the data application may be alerted by context server 215 when a pushed document is available.

Figure 21:
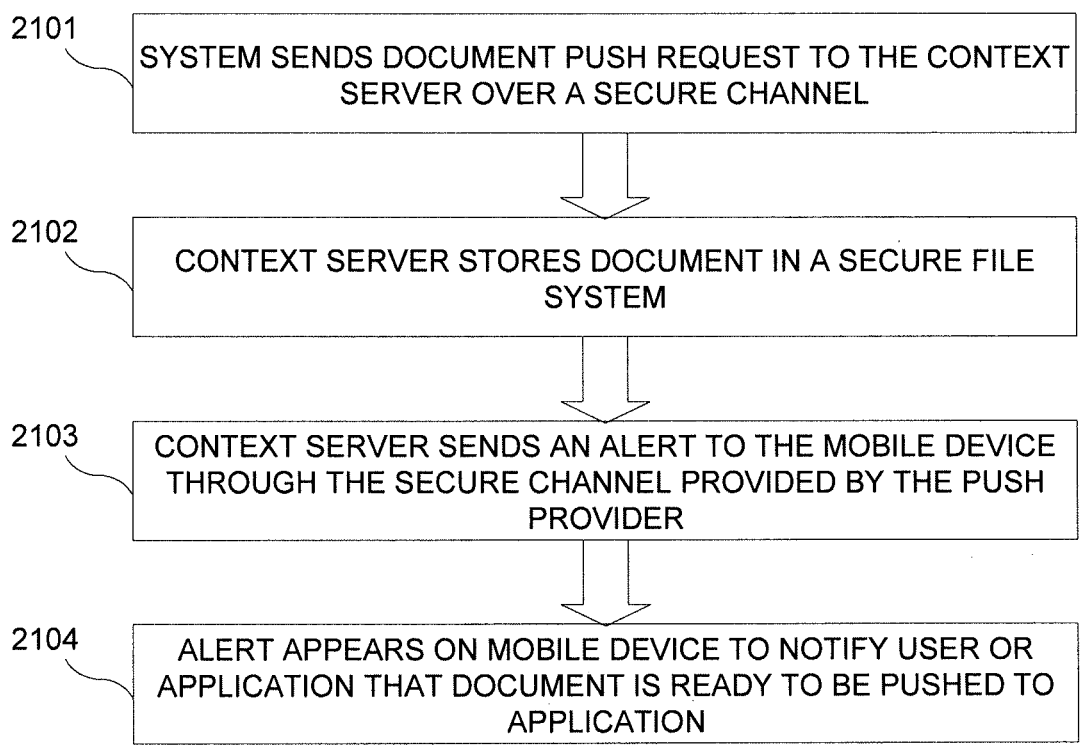
FIG. 21 shows a flow diagram for sending a pushed document to a user device over a secure communications channel in accordance with various aspects of the embodiments.
Figure 22:
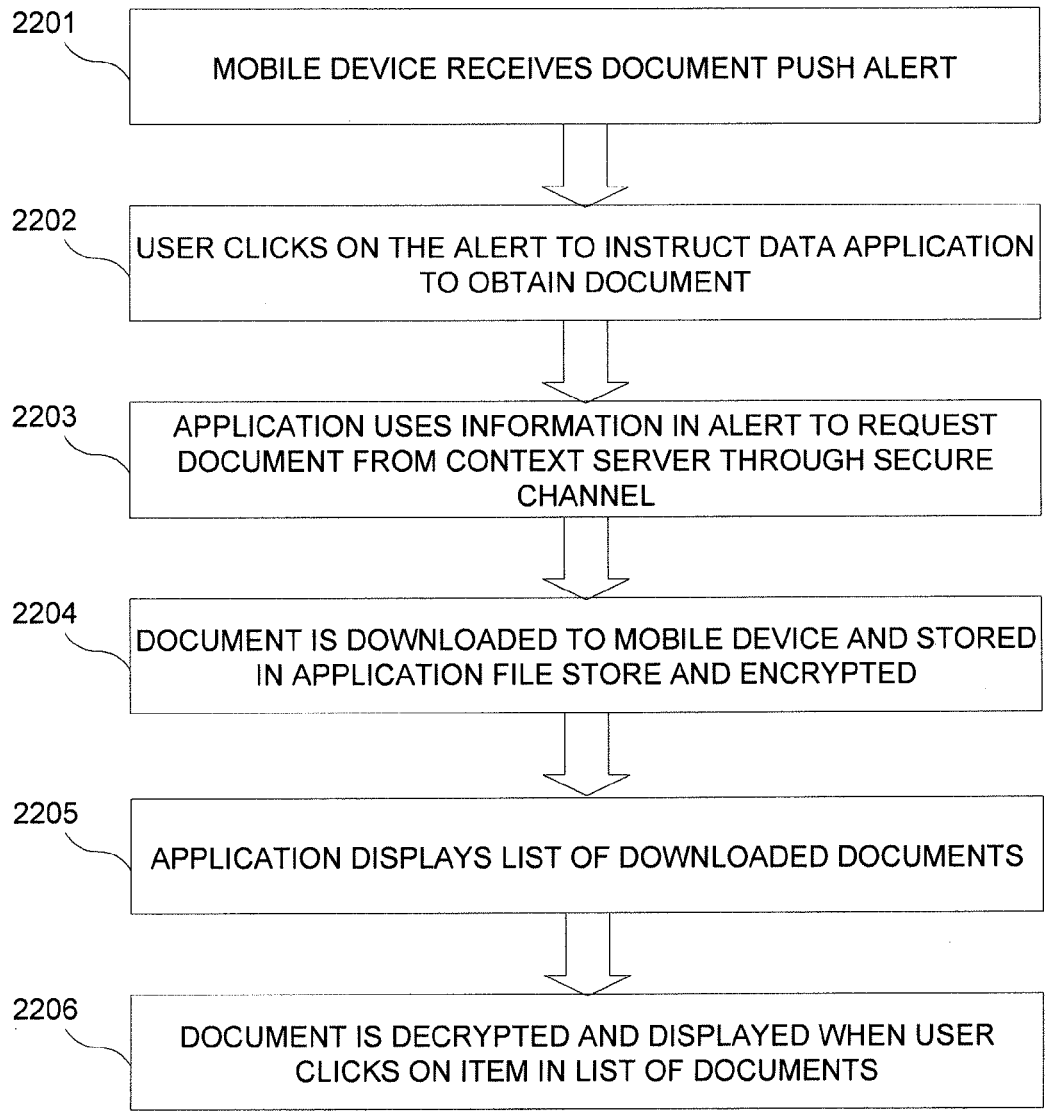
FIG. 22 shows a flow diagram for processing a pushed document by a data application in accordance with various aspects of the embodiments.

FIG. 21 shows flow diagram 2100 for sending a pushed document to a user device over a secure communications channel in accordance with various aspects of the embodiments. At block 2101, a business system may send one or more documents through context server 215 (as shown in FIG. 2) to a user device through a secure channel. Server 215 may store the one or more documents in a secure file system (not explicitly shown in FIG. 2) at block 2102 until the documents are downloaded to the user device.

Figure 23:
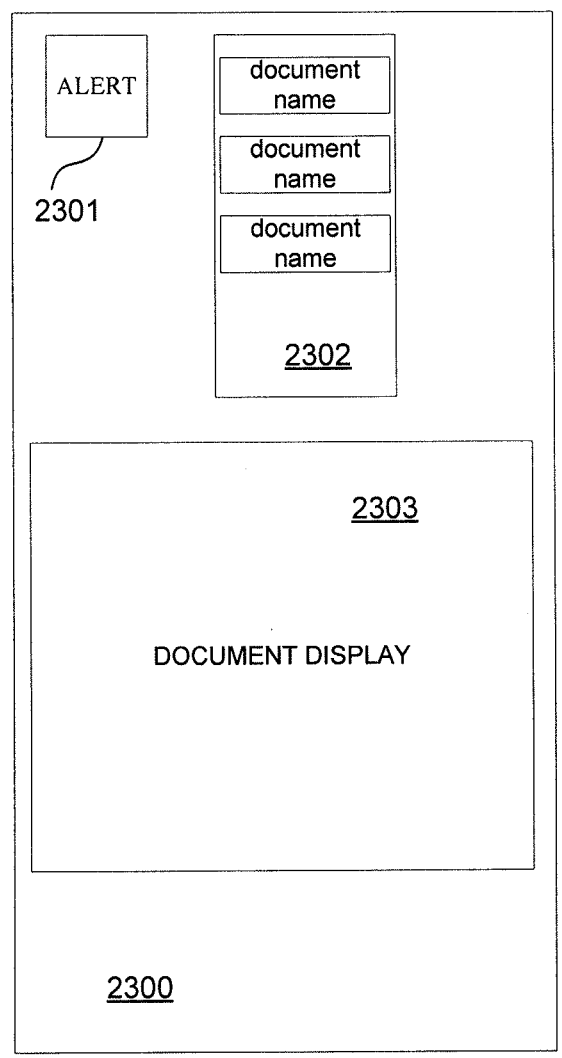
FIG. 23 shows different display regions supported by a user device when executing a data application in accordance with various aspects of the embodiments.

At block 2103, context sever 215 sends an alert message to the user device through the secure channel provided by a push provider (e.g., through wireless gateway 211 as shown in FIG. 2). At block 2104, an alert notification (e.g., alert indication 2301) is displayed on the user device as shown in FIG. 23. However, with the some embodiments the alert notification may be visual and/or audible.

FIG. 22 shows flow diagram 2200 for processing a pushed document by a data application in accordance with various aspects of the embodiments. At block 2201, the user device receives and displays a document push alert (corresponding to block 2104 as shown FIG. 21).

At block 2202, if the user clicks on the alert indication, for example on a touchpad display, the data application is instructed to obtain the pushed document from context server 215 through the push provider. With some embodiments, an alert notification may be received irrespective of whether the data application is already running or not. For example, if the data application is already running, the user may be given an option to download the content. If the data application is not running, the data application may be launched when the user responds affirmatively.

At block 2203, the data application may use information in the alert message to request one or more documents that may be available from context server 215 through a secure channel. The alert message may contain information including the message presented to the user, name of the content file being pushed, and workflow name that indicates whether the content is being added or deleted.

At block 2204, the one or more documents may be downloaded to the user device from context server 215 and may be further encrypted and stored in the application file store.

At block 2205, the data application generates a list of the one or more documents that have been downloaded in display region 2302 as shown in FIG. 23. At block 2206, the user may select one of the documents, for example by clicking one of the items in the displayed list, so that the selected document is decrypted and displayed.

While FIG. 23 shows different display regions supported by the user device when executing a data application, the different display regions may be displayed at different times as the data application sequentially executes processes 1900-2200 of FIGS. 19-22, respectively. For example, the alert indication may be displayed in region 2301, followed by the document list in region 2302, and then followed by the selected document in region 2303.

FIG. 24 shows apparatus 2401 that executes a data application for receiving content (e.g., a pushed document) in accordance with various aspects of the embodiments. Apparatus, for example, may support a user terminal, e.g., terminals 204-209 as shown in FIG. 2 that communicates with context server 215 through a push provider. Apparatus 2401 is only one example of a suitable computing environment and is not intended to suggest any limitation as to the scope of use or functionality of the embodiments. Apparatus 2401 should not be interpreted as having any dependency or requirement relating to any one or combination of components shown in the illustrative apparatus 2401.

The embodiments are operational with numerous other general purpose or special purpose computing system environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Apparatus 2401 may have a processor 2403 for controlling overall operation of apparatus 2401 and its associated components, including RAM 2405, ROM 2407, communications module 2409, and memory 2415. Apparatus 2401 typically includes a variety of computer readable media. Computer readable media may be any available media that may be accessed by apparatus 2401 and include both volatile and nonvolatile media, removable, and non-removable media. By way of example, and not limitation, computer readable media may comprise a combination of computer storage media and communication media.

As previously discussed, computer storage media may include volatile and nonvolatile, removable and non-removable media implemented in any method or technology for storage of information such as computer readable instructions, data structures, program modules or other data. Computer storage media may include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by apparatus.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Communications module 2409 may include an interface to communicate to context server 215 through a wireless gateway (e.g., gateways 211-212), SMS aggregator 213, or directly with a wireless carrier network as shown in FIG. 2.

Software may be stored within memory 2415 and/or storage to provide instructions to processor 2403 for enabling apparatus 2401 to perform various functions, e.g., processes 1900-2200 as shown in FIGS. 19-22, respectively. For example, memory 2415 may store software used by apparatus 2401, such as an operating system 2417, and application programs, e.g., data application 2419. Alternatively, some or all of the computer executable instructions for apparatus 2401 may be embodied in hardware or firmware (not explicitly shown).

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

We claim:

1. A first apparatus comprising: at least one memory; and at least one processor coupled to the at least one memory and configured to perform, based on instructions stored in the at least one memory: initiating execution of a data application for a user through an operating system in response to entering a correct password; after the correct password has been entered, detecting whether the user is allowed privileged control within the operating system; when the allowed privileged control is detected, deleting all stored documents from an allocated storage of the data application; when the allowed privileged control is not detected, sending a registration request to a second apparatus; when a received registration response indicates that of the user is not associated with a specified business, deleting all stored documents from the allocated storage of the data application; when the correct password is entered, the allowed privilege control is not detected, and the received registration response indicates that the user is associated with the specific business, receiving an alert notification when at least one document is available; when the alert notification is selected, sending a document request for the least one document; receiving the at least one document when the alert notification is selected; generating a list of documents, wherein the list includes at least one entry for the at least one documents; and when one of the documents is selected from the list, displaying said one document.

2. A computer-assisted method comprising: for performing operations for a data application that processes at least one pushed document to a device, the method comprising: Initiating execution of the data application for a user in response to entering a correct password; after the correct password has been entered, determining whether the device on which an operating system is executing has been rooted, wherein the user has attained unauthorized privileged control within the operating system; and when rooting of the device has been detected, preventing access, to all stored documents from an allocated storage of the data application when rooting of the device has not been detected, sending device registration to a computer system of a specified business; receiving a registration response; and when the registration response is indicative that the user is not associated with the specified business, deleting all stored documents from the allocated storage of the data application.

3. The method of claim 2, wherein the preventing comprises:
deleting, by the first computer system, all said stored documents from the allocated storage of the data application.

4. The method of claim 2, wherein the initiating comprises: when the user of the first computer system fails to enter the correct password within a predetermined number of times, locking the data application for a predetermined time duration.

5. The method of claim 2, further comprising: when the operating system is not detected as being compromised, sending the device registration to a second computer system of the specified business.

6. The method of claim 5, further comprising: when the registration response is indicative of at least one condition from a set of conditions that are indicative of the user of the first computer system not being associated with the specified business, the first computer system being lost, and the first computer system being stolen, deleting, by the first computer system, all stored documents from the allocated storage of the data application.

7. The method of claim 2, further comprising: when the correct password is entered and the operating system is not detected as being compromised, receiving an alert notification when content is available.

8. The method of claim 7, wherein the content comprises at one least document.

9. The method of claim 7, wherein the content comprises customer information.

10. The method of claim 8, further comprising:
when the alert notification is selected, sending a document request for the least one document; and
receiving the at least one document.

11. The method of claim 10, further comprising:
storing the at least one document in the allocated storage of the data application.

12. The method of claim 11, further comprising:
encrypting the at least one document.

13. The method of claim 10, further comprising:
generating a list of documents, wherein the list includes at least one entry for the at least one documents; and
when one of the documents is selected from the list, displaying said one document.

14. The method of claim 8, further comprising:
receiving, by the second computer system, a push content request to the user generated by a workflow that is performed through a business infrastructure, wherein the push content request includes a user identification;
mapping, by the second computer system, the user identification to a device type from a plurality of device types; and
in response to the received push content request, directing the alert notification through a mobile communication channel type to the first computer system based on the device type.

15. The method of claim 14, further comprising:
receiving the document request from the first computer system; and
in response to the received document request, downloading the at least one document to the first computer system through the communication channel type.

16. A first apparatus for supporting operations for a data application that processes at least one pushed document to the first apparatus, the first apparatus comprising: at least one memory; and
at least one processor coupled to the at least one memory and configured to perform, based on instructions stored in the at least one memory;
Initiating execution of the data application for a user in response to entering a correct password; after the correct password has been entered, determining whether the first apparatus on which an operating system is executing has been rooted, wherein the user has attained unauthorized privileged control within the operating system; when rooting of the device has been detected, deleting all stored documents from an allocated storage of the data application; when rooting of the first apparatus has not been detected, sending device registration to a computer system of a specified business; receiving a registration response; and when the registration response is indicative that the user is now associated with the specified business, deleting all stored documents from the allocated storage of the data application.

17. The first apparatus of claim 16, wherein the at least one processor is further configured to perform:
when the operating system is not detected as being compromised, sending device registration to a second apparatus of a specified business; and
when the registration response is indicative of at least one condition from a set of conditions that are indicative of the user of the first apparatus not being associated with the specified business, the first apparatus being lost, and the first apparatus being stolen, deleting all stored documents from the allocated storage of the data application.

18. The first apparatus of claim 16, wherein the at least one processor is further configured to perform: when the correct password is entered and the operating system is not detected as being compromised, receiving an alert notification when at least one document is available; when the alert notification is selected, sending a document request for the least one document; receiving the at least one document; generating a list of documents, wherein the list includes entries for the at least one documents; and when one of the documents is selected from the list, displaying said one document.

19. A non-transitory computer-readable storage medium storing computer-executable instructions that, when executed, cause at least one processor to perform operations for a data application that processes at least one pushed document to a device, the operations comprising:
Initiating execution of the data application for a user in response to entering a correct password; after the correct password has been entered, determining whether the device on which an operating system is executing has been rooted, wherein the user has attained unauthorized privileged control within the operating system; when rooting of the device has been detected, deleting all stored documents from an allocated storage of the data application; when rooting of the device has not been detected, sending device registration to a computer system of a specified business; receiving a registration response; and when the registration response is indicative that the user is not associated with the specified business, deleting all store documents from the allocated storage of the data application.

20. The computer-readable medium of claim 19, wherein the computer-executable instructions, when executed, cause the at least one processor to perform:
when the correct password is entered, the operating system is not detected as being compromised, and the registration response indicates that the user is associated with the specific business, receiving an alert notification when at least one document is available; when the alert notification is selected, sending a document request for the least one document; receiving the at least one document, generating a list of documents, wherein the list includes at least one entry for the at least one documents; and when one of the documents is selected from the list, displaying said one document.

* * * * *